(12) United States Patent
Ding et al.

(10) Patent No.: US 12,099,568 B2
(45) Date of Patent: Sep. 24, 2024

(54) PLATFORM AND ARCHITECTURE FOR DISTRIBUTING CONTENT INFORMATION

(71) Applicant: NETFLIX, INC., Los Gatos, CA (US)

(72) Inventors: Evers Ding, Milpitas, CA (US); Jacob A. Grice, Johns Creek, GA (US); Ashley Love, Crescent Springs, KY (US); Christine Mitchell, West Hollywood, CA (US); Nicholas A. Mooney, San Jose, CA (US); Cole Patrick Turner, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/060,339

(22) Filed: Nov. 30, 2022

(65) Prior Publication Data

US 2023/0177101 A1    Jun. 8, 2023

Related U.S. Application Data

(60) Provisional application No. 63/285,960, filed on Dec. 3, 2021.

(51) Int. Cl.
*G06F 16/957*    (2019.01)
*G06F 16/958*    (2019.01)
(Continued)

(52) U.S. Cl.
CPC ........ *G06F 16/9577* (2019.01); *G06F 16/972* (2019.01); *G06F 40/123* (2020.01); *G06F 40/14* (2020.01); *G06F 40/197* (2020.01)

(58) Field of Classification Search
CPC .. G06F 16/9577; G06F 16/972; G06F 40/123; G06F 40/197; G06F 40/14
See application file for complete search history.

(56) References Cited

U.S. PATENT DOCUMENTS 7,131,062 B2 * 10/2006 Nguyen ................ G06F 16/972
                                                  715/201
9,208,250 B2 * 12/2015 Gupta .................. G06F 16/9574
(Continued)

FOREIGN PATENT DOCUMENTS

CA    2747145 A1 *  1/2013  ......... G06F 16/3322

OTHER PUBLICATIONS

International Search Report for Application No. PCT/US2022/080758 dated Mar. 17, 2023.
(Continued)

*Primary Examiner* — Shahid K Khan
(74) *Attorney, Agent, or Firm* — Artegis Law Group, LLP

(57) ABSTRACT

In various embodiments, a content platform receives, from a user device, a request for a web page. In response to receiving the request for the web page, the content platform retrieves one or more page construction items associated with the web page and one or more page content items associated with the web page, wherein each page construction item included in the one or more page construction items indicates a structure of a different element included in the web page and each page content item included in the one or more page content items indicates a content of a different element included in the web page. The content platform generates a content interface associated with the web page based on the one or more page construction items, the one or more page content items, and user data associated with a user of the user device.

20 Claims, 10 Drawing Sheets

(51) Int. Cl.
  *G06F 40/123* (2020.01)
  *G06F 40/14* (2020.01)
  *G06F 40/197* (2020.01)

(56) References Cited

U.S. PATENT DOCUMENTS

| | | |
|---|---|---|
| 2001/0056460 A1 | 12/2001 | Sahota et al. |
| 2002/0194194 A1* | 12/2002 | Fenton ............... H04N 21/2743 |
| 2004/0030726 A1 | 2/2004 | Baxter et al. |
| 2006/0031751 A1 | 2/2006 | Ehud |
| 2006/0282758 A1* | 12/2006 | Simons ............... G06F 16/9577 |
| | | 382/173 |
| 2006/0294199 A1* | 12/2006 | Bertholf ............... G06F 16/972 |
| | | 709/217 |
| 2009/0177959 A1* | 7/2009 | Chakrabarti .......... G06F 16/951 |
| | | 715/234 |
| 2010/0005385 A1 | 1/2010 | Trabucco et al. |
| 2010/0095197 A1 | 4/2010 | Klevenz et al. |
| 2013/0104026 A1 | 4/2013 | Reynar et al. |
| 2013/0275854 A1* | 10/2013 | Lim ..................... G06F 40/205 |
| | | 715/234 |
| 2014/0101182 A1* | 4/2014 | Roy ........................ G06F 16/93 |
| | | 707/756 |
| 2014/0173418 A1 | 6/2014 | Seifert et al. |
| 2014/0201615 A1 | 7/2014 | Rajkumar et al. |
| 2014/0223573 A1* | 8/2014 | Reedy ................ H04L 63/0428 |
| | | 726/26 |
| 2015/0019614 A1* | 1/2015 | Pierre-March .......... H04L 67/60 |
| | | 709/201 |
| 2015/0067030 A1 | 3/2015 | Smith et al. |
| 2017/0109454 A1* | 4/2017 | Berk ..................... G06F 40/106 |
| 2017/0124061 A1 | 5/2017 | Amerige et al. |
| 2018/0196793 A1* | 7/2018 | Hsu ..................... G06F 16/9566 |
| 2021/0134263 A1 | 5/2021 | Schiller |

OTHER PUBLICATIONS

Non Final Office Action received for U.S. Appl. No. 18/060,330 dated Nov. 9, 2023, 22 pages.
Final Office Action received for U.S. Appl. No. 18/060,330 dated May 20, 2024, 24 pages.
Advisory Action received for U.S. Appl. No. 18/060,330, dated Jul. 26, 2024, 5 pages.

* cited by examiner

PLATFORM AND ARCHITECTURE FOR DISTRIBUTING CONTENT INFORMATION

CROSS-REFERENCE TO RELATED APPLICATIONS

This application claims the priority benefit of United States Provisional Patent Application titled, "PLATFORM AND ARCHITECTURE FOR DISTRIBUTING CONTENT INFORMATION," filed on Dec. 3, 2021, and having Ser. No. 63/285,960. The subject matter of this related application is hereby incorporated herein by reference.

BACKGROUND

Field of the Various Embodiments

Embodiments of the present disclosure relate generally to computer science and content management and, more specifically, to a platform and architecture for distributing content information.

Description of the Related Art

A content management system (CMS) manages the creation, storage, and delivery of web-based content, such as blogs, articles, media galleries, and other types of web pages. In some implementations, a CMS provides an editor graphical user interface (GUI) that allows content creators to specify the contents of a web page (e.g., text, images, videos, and/or the like) and how the contents should be displayed (e.g., text formatting, image and video display properties, page appearance, and/or the like). Subsequently, when a user requests a given web page, the CMS compiles the web page based on the specifications from the content creator(s) and delivers the web page to the requesting user.

In one approach, a content management system uses a what-you-see-is-what-you-get (WYSIWYG) technique for creating and delivering the web-based content. In such an approach, the editor GUI enables the content creator to view the web page that would be delivered to a user based on the current specification provided by the content creator. For example, when the content creator enters text and specifies the formatting for the text (e.g., font type, font size, spacing, paragraph properties, and/or the like), the editor GUI displays the text using the specified formatting. As the content creator makes changes to the text and/or formatting, the editor GUI is updated to reflect the changes. However, because the CMS is configured to deliver a web page that matches, or substantially matches, what was specified by the content creator, the CMS is not designed to account for any user-specific inputs or parameters. As a result, the CMS is only able to provide generic content that is not personalized for individual users. For example, the CMS typically cannot modify the content based on the preferences or interests of an individual user.

In another approach, a CMS can use machine learning models to generate personalized content for users. For example, instead of specifying specific content, a content creator could specify one or more content parameters (e.g., one or more topics, one or more user profile fields, content type, and/or the like) and how the content should be displayed (e.g., text format, image and video display properties, page appearance, and/or other display properties). When a user requests a web page, the CMS uses one or more machine learning models to generate content for the web page based on one or more content parameters specified by the content creator(s). However, making changes to the content provided by the CMS (e.g., modifying the types of content parameters that can be specified, how the machine learning model(s) generate content, and the like) requires making changes to the machine learning models or algorithms used which requires significant time and resources. As a result, the CMS is unable to flexibly adapt to new use cases and content types. Furthermore, because the content provided by the CMS is generated on-the-fly and can vary for each individual user, errors in the generated content cannot be easily identified and addressed before the content is provided to the user.

As the foregoing illustrates, what is needed in the art are more effective content management systems.

SUMMARY

One embodiment sets forth a method for generating personalized web content. The method includes receiving, from a user device, a request for a web page; in response to receiving the request for the web page, retrieving one or more page construction items associated with the web page and one or more page content items associated with the web page, wherein each page construction item included in the one or more page construction items indicates a structure of a different element included in the web page and each page content item included in the one or more page content items indicates a content of a different element included in the web page; and generating a content interface associated with the web page based on the one or more page construction items, the one or more page content items, and user data associated with a user of the user device.

At least one technical advantage of the disclosed techniques relative to the prior art is that, with the disclosed techniques, a content platform delivers web-based content to a given user that includes both content that is explicitly provided by a content creator via a content management system and personalized content that is generated for the given user. In particular, by converting content received from the content management system into different atomic elements, the content platform can personalize specific atomic elements without affecting the overall look and feel of the content specified by the content creator. Furthermore, the personalized atomic elements are identified based on portions of the content where the content creator specified that personalization should occur. As a result, using the disclosed techniques, a content creator can predict and control the amount, location, and appearance of personalized content within a given web page, which the content creator could not do using a typical content management system. These technical advantages provide one or more technical advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
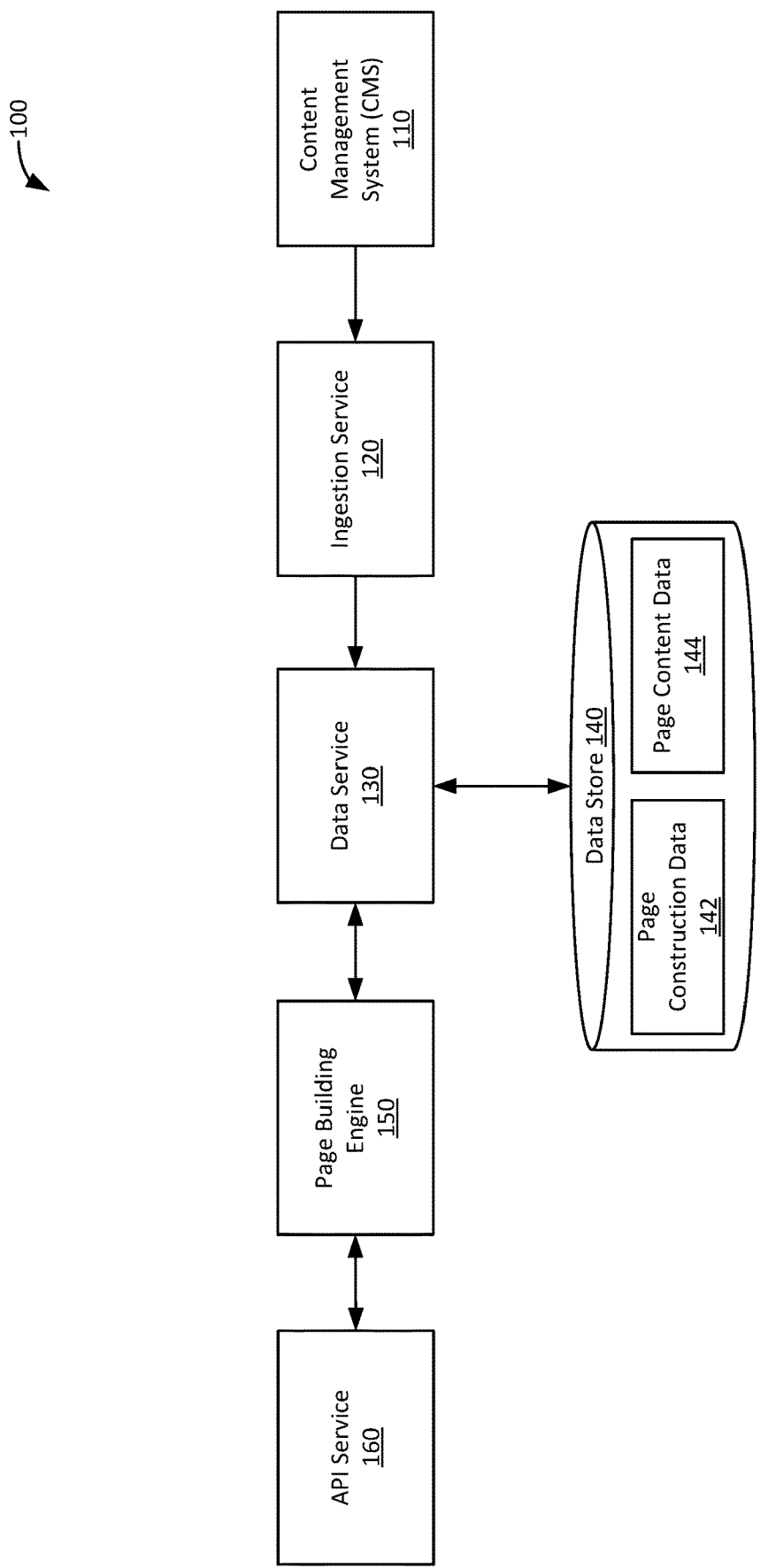
FIG. 1 illustrates an example content platform, according to various embodiments.

In the following description, numerous specific details are set forth to provide a more thorough understanding of the various embodiments. However, it will be apparent to one skilled in the art that the inventive concepts may be practiced without one or more of these specific details.

Overview

A content management system (CMS) manages the creation, storage, and delivery of web-based content, such as blogs, articles, media galleries, and other types of web pages. In some implementations, a CMS provides an editor graphical user interface (GUI) that allows content creators to specify the contents of a web page (e.g., text, images, videos, and/or the like) and how the contents should be displayed (e.g., text formatting, image and video display properties, page appearance, and/or the like). Subsequently, when a user requests a given web page, the CMS could compile the web page based on the specifications from the content creator(s) and delivers the web page to the requesting user. Different CMS can use different approaches for content creation and delivery.

In some approaches, a CMS uses a what-you-see-is-what-you-get (WYSIWYG) technique for creating and delivering the web-based content. In such an approach, the editor GUI enables the content creator to view the web page that would be delivered to a user based on the current specification provided by the content creator. However, because the CMS is configured to deliver a web page that matches, or substantially matches, what was specified by the content creator, the CMS is not designed to account for any user-specific inputs or parameters. As a result, the CMS is only able to provide generic content that is not personalized for individual users.

In other approaches, a CMS uses machine learning models to generate personalized content for users. A content creator specifies content parameters associated with a web page instead of specific content. The CMS uses the content parameters as input to machine learning models that generate content for a requested web page. However, making changes to the content provided by the CMS requires making changes to the machine learning models or algorithms used by the CMS, which requires significant time and resources. As a result, the CMS is unable to flexibly adapt to new use cases and content types. Additionally, because the content provided by the CMS is generated on-the-fly and can vary for each user, the content creator cannot easily identify and address errors in the generated content.

With the disclosed techniques, a content platform receives web pages created by a content creator via a CMS and divides the web page into a plurality of atomic elements. The content platform translates each atomic element into a data format and data structure that can be processed by downstream components included in the content platform in order to generate personalized web page content. Subsequently, in response to a request for the web page, the content platform constructs a content interface associated with the requested page from the plurality of atomic elements. As referred to herein, a content interface is any interface that is used to present content to an end user via a web-based application, such as a browser or native application (e.g., mobile device application, television application, set-top box application, and/or the like). For example, if a request for the web page is received from a browser, then the content interface could be the requested web page. As another example, if the request for the web page is received from a mobile application, then the content interface could be an application interface of the mobile application. While constructing the content interface, the content platform can generate dynamic content based on an individual atomic element.

Advantageously, by converting a web page from CMS data into different atomic elements that can be processed by the components included in the content platform, the content platform is able to control the location, amount, type, and granularity at which personalization and other custom rules and algorithms are applied to the web page. In addition, because the process of creating web pages is separated from the process of applying various rules, algorithms, and machine learning models to the web pages, the individual rules, algorithms, and/or machine learning models can be easily created, modified, and/or removed without modifications to either the CMS or to any of the atomic elements. Furthermore, using the disclosed techniques, personalized content can be created for different content interfaces, such as for application interfaces, using the same set of atomic elements.

Content Platform Overview

FIG. 1 illustrates an example content platform 100, according to various embodiments. As shown in FIG. 1, content platform 100 includes a content management system (CMS) 110, an ingestion service 120, a data service 130, a data store 140, a page building engine 150, and an API service 160.

Each of CMS 110, ingestion service 120, data service 130, data store 140, page building engine 150, and API service 160 are executed on one or more computing devices. In some embodiments, each of CMS 110, ingestion service 120, data service 130, data store 140, page building engine 150, and API service 160 execute on one or more corresponding computing devices. In some embodiments, one or more of CMS 110, ingestion service 120, data service 130, data store 140, page building engine 150, and API service 160 executes on one or more computing devices that are also executing other components of content platform 100.

A computing device can be, for example and without limitation, a server, personal computer, laptop or tablet computer, mobile computer system, or any other device suitable for practicing the various embodiments described herein. In some embodiments, a computing device includes one or more processors, such as a central processing unit (CPU), a graphics processing unit (GPU), an application-specific integrated circuit (ASIC), a field programmable gate array (FPGA), an artificial intelligence (AI) accelerator such as a tensor processing unit (TPU), any other type of processing unit, or a combination of different processing units, such as a CPU configured to operate in conjunction with a GPU. Additionally, a computing device includes one or more memories, such as a random-access memory (RAM) module, a flash memory unit, or any other type of memory unit or combination thereof, and the processor(s) included in the computing device are configured to read data from and write data to the memories. The one or more memories include various software programs that can be executed by the processor(s) included in the computing device and application data associated with the software programs, including one or more of content management system 110, ingestion service 120, data service 130, data store 140, page building engine 150, and API service 160.

Generally, a computing device can be a physical computing system or could be a virtual computing embodiment executing within a computing cloud. In some embodiments, one or more of content management system 110, ingestion service 120, data service 130, data store 140, page building engine 150, and API service 160 are executed on multiple physical and/or virtual computing devices, such as within a computing cloud, a distributed computing system, and/or the like.

Content platform 100 manages the creation, storage, and delivery of web pages. Content platform 100 receives web pages created by an editor or other content creator via a CMS (e.g., CMS 110), divides the web page into a plurality of atomic elements, and translates each atomic element into a data format and data structure that can be processed by the components included in the content platform 100 (e.g., data service 130, page building engine 150, and API service 160).

Subsequently, in response to a request for the web page, content platform 100 constructs the requested page from the plurality of atomic elements. While constructing the web page, content platform 100 can generate dynamic content based on one or more atomic elements, apply personalization algorithms to one or more atomic elements, use machine learning to select additional atomic elements or other content to include in the web page, and/or the like. Therefore, by converting a web page from a CMS into different atomic elements, the content platform 100 is able to control the location, amount, type, and granularity at which personalization and other custom rules and algorithms are applied to the web page. In addition, because the process of creating web pages is separated from the process of applying various rules, algorithms, and/or machine learning models to the web pages, the various rules, algorithms, and/or machine learning models can be easily created, modified, and/or removed without modifications to the CMS or to any of the web pages.

In operation, CMS 110 is configured to receive web page content from editors and other content creators. An editor creates, modifies, and publishes web pages via the CMS 110. In some embodiments, the CMS 110 includes one or more user interfaces (e.g., text-based, graphical user interface, and/or the like) via which an editor can specify the content included in a web page, the layout of the content included in the web page (e.g., page structure), display settings of the content included in the web page (e.g., font styles, paragraph styles, image and video properties, and/or the like), and/or other parameters associated with a web page (e.g., title, byline, tags, categories, metadata, search engine optimization fields, and/or the like).

In some embodiments, CMS 110 includes a plurality of pre-defined page types (e.g., article, video or trailer page, media title page, talent or cast page, story page, media gallery, and/or the like). Each page type is associated with a specific layout and/or with one or more specific types of content items. Additionally, in some embodiments, a page type is also associated with one or more specific parameters. When the user creates a web page of a given page type, the CMS 110 generates a user interface for an editor to enter data for each content item and/or parameter associated with the given page type. Accordingly, CMS 110 guides editors to enter and/or select content and parameter values appropriate for the given page type.

As an example, CMS 110 could include an article template that defines the layout (e.g., number, structure, and/or order of content items) and content for an article. The article template could specify, for example, that an article should include parameter values such as an internal name, a page title, a page theme, search engine optimization (SEO) settings (e.g., SEO title, SEO description, SEO keywords, whether to hide from search engines, and/or the like), article headline, article deck and/or byline (below the headline text), eyebrow (above the text), author information, headline image, and/or the like in addition to the main body of the article. The layout could specify, for example, the order and appearance of the headline image, headline, deck, byline, eyebrow, and main body of the article within the web page. When an editor creates a new article, CMS 110 provides an interface that includes fields for entering each of the parameters specified by the article template. CMS 110 applies the specified layout to the content data entered by the editor.

In some embodiments, a web page can incorporate content from one or more other web pages or portions of the web pages instead of recreating content included in the one or more other web pages or portions of the web pages. In such embodiments, the CMS 110 could include user interface elements that allow an editor to select another web page (e.g., another web page created via the CMS 110) or a portion of another web page (e.g., a specific section of a web page) for inclusion in the web page. In some embodiments, if an editor specifies content from another web page, CMS 110 determines an identifier associated with the web page (e.g., content identifier, page URL, and/or the like) and generates a reference to the content based on the identifier. The reference to the content is used to identify and retrieve the content when incorporating the content into the web page.

In some embodiments, a web page can include data references instead of specific content text. For example, to refer to the title of a given media content, the web page can include a reference to the title of the given media content rather than the editor explicitly entering the title. A data reference can be for any suitable type of data, such as metadata for video content (e.g., title, summary, release date, number of seasons, number of episodes, total runtime, director, rating), person information (e.g., name and age), user information (e.g., username, first name, last name, location), image metadata (e.g., title, description, photographer). In such embodiments, the CMS 110 could include user interface elements that allow an editor to select the data reference for inclusion in the web page. Additionally, the CMS 110 could communicate with one or more external data sources to obtain information associated with the data reference. For example, for entering a video title, CMS 110 could communicate with a media content provider server to obtain a list of videos and display a selectable list of video titles. In some embodiments, a data reference can be for an image stored at an external data source, such as an image library. In such embodiments, the CMS 110 could include user interface elements that allow an editor to view and select images from the external data source for inclusion in the web page.

In some embodiments, if an editor specifies a reference to external data, CMS 110 generates data, such as a tag, that references the external data. In some embodiments, the metadata includes a type of data (e.g., name) and an identifier of an entity (e.g., article, video, image, cast, crew) with which the type of data is associated. For example, if the user selects a video title for a given video, CMS 110 generates a tag that indicates that the referenced data is a video title and an identifier corresponding to the given video. The metadata is used to identify and retrieve the referenced data when incorporating the data into the web page. In some embodiments, the metadata further includes an indication of the data source from which the referenced data should be retrieved or includes the indication of the data source instead of the type of data and/or the identifier.

In some embodiments, referenced content and/or referenced data are incorporated in the web page at a later time (e.g., when the page is processed by ingestion service 120, when the page is constructed by page building engine 150, before the page is delivered by API service 160, and/or the like). In some embodiments, data references and content references are resolved at the same time (e.g., as part of the page construction and delivery process). In some embodiments, the time at which data references are resolved (incorporated into the web page) differs from the time at which content references are resolved. Additionally, the element(s) of content platform 100 that resolves data references could differ from the element(s) that resolve content references. In some embodiments, the same element(s) of content platform 100 resolve both data references and content references.

In some embodiments, a web page includes dynamic content such as placeholder sections or placeholder content items that are not explicitly defined by the editor. When creating a web page, instead of entering content data for a given section or for a given content item, an editor can specify that the section or content item corresponds to dynamic content. Additionally, the editor can specify one or more parameters used to generate the dynamic content, such as content type (e.g., text, video, image, list or feed, gallery, and/or the like), types of user information (e.g., favorited content items, watch history, location, preferred content types, preferred media genres, and/or the like), display format for different content types (i.e., how generated content should be displayed), rule(s) and/or algorithm(s) to use when generating the content, rule(s) and/or algorithm(s) to avoid, and/or the like. In some embodiments, instead of providing specific parameters, the editor selects from a list of pre-defined dynamic content. For example, pre-defined dynamic sections could include a section that lists the most popular articles, a section that lists the newest articles, a section that lists trending articles, a section that lists articles suggested for the user requesting the web page, a section that displays videos associated with the content of the web page (e.g., a specific person, movie, tv show, and/or the like), a section that summarizes the content of the web page, and/or the like.

As an example, CMS 110 could include a media title template that defines the layout and content for a media title landing page. In the context of a media service provider that streams media content such as movies and television shows to users, a media content landing page provides information associated with a given media content item, such as a summary, episode guides, cast information, behind the scenes information or content, articles associated with the media content item, and/or the like. One or more of the summary, episode guides, cast information, behind the scenes content, related articles, and/or the like could be generated dynamically.

For example, an editor could specify a dynamic cast information section. The editor selects or enters, for the cast information section, the list of cast members for the given media content item. CMS 110 generates data indicating that the dynamic section is a cast information section and the list of cast members included in the cast information section. The layout and content of the cast information section is subsequently generated based on the list of cast members.

As another example, rather than linking specific articles, the editor could specify a dynamic related articles section. In some embodiments, the editor indicates how the related articles are selected (e.g., popular, trending, latest, suggested for the user, and/or the like) for the dynamic section. In some embodiments, the editor selects a specific dynamic section type (e.g., latest articles feed, trending articles feed, popular articles feed, customized articles section, and/or the like). CMS 110 generates data indicating that the dynamic section is a list of articles and the method(s) by which the articles included in the list should be selected. The layout and content of the related articles section is subsequently generated based on a dynamically selected list of articles.

Figure 2:
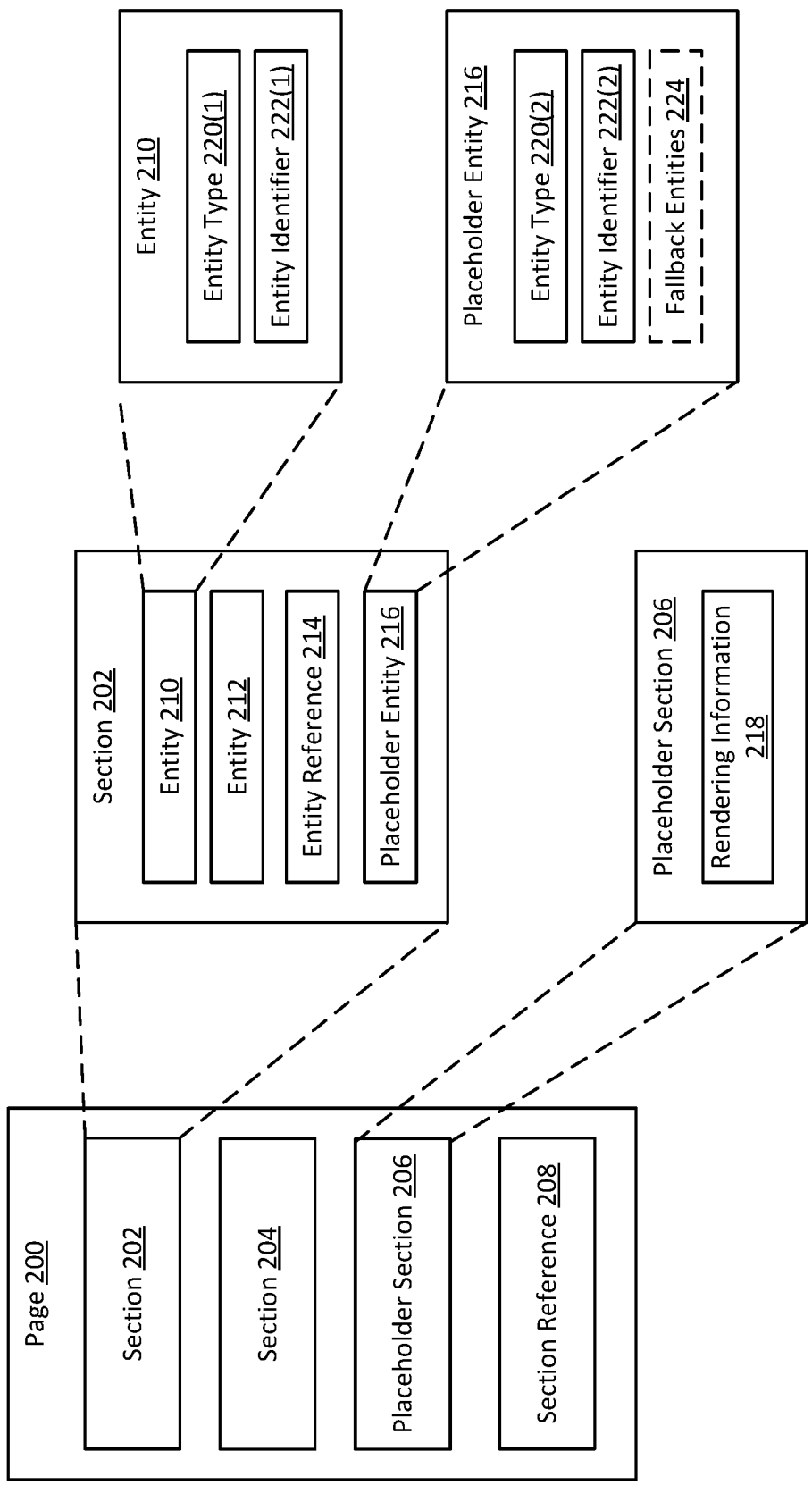
FIG. 2 is a block diagram of an exemplar web page, according to various embodiments.

FIG. 2 is a block diagram of an exemplar web page 200, according to various embodiments. A structure of web page 200 corresponds to the number of sections included in web page 200 and the order of the sections included in web page 200. As shown in FIG. 2, web page 200 includes a section 202, a section 204, a placeholder section 206, and a section reference 208, arranged in order such that section 202 is at the top of web page 200 and section reference 208 is at the bottom of web page 200.

The page structure illustrated in FIG. 2 is an example and, in practice, a web page can include any number of sections, any types of sections, any number of each type of section (including zero), and/or in any order. Additionally, although FIG. 2 illustrates the web page 200 having a vertical layout (top to bottom), such that each section is displayed below a previous section, a web page can have any suitable layout, such as a vertical layout, a horizontal layout, a grid layout, a combination of multiple layouts, and/or the like. In some embodiments, the layout of the sections included in a page is specified by an editor. In some embodiments, the layout of the sections included in a page is controlled by a template on which the page is based. In some embodiments, the layout of the sections is dynamic and is not specified in advanced. Instead, the layout is determined when the web page 200 is constructed (e.g., by page building engine 150).

In some embodiments, a given section can be a static section, a dynamic or placeholder section, or a section reference. A static section is a section whose content is explicitly defined in the CMS 110. A static section could be defined by an editor and/or by the CMS 110. For example, the editor could specify the number of entities included in a section, the order of the entities, the type of each entity, and/or the like. As another example, the CMS 110 could include section templates that control the number, order, and/or type of entities included in the section. The user can define the content data or information for each entity. The static section includes, for example, the static content defined in the CMS 110. Additionally, if the static section is based on a template section, the static section could include a reference to the template and/or a copy of the reference to the elements (e.g., structure or layout information, display configurations for different entity types, color scheme, and/or the like).

A dynamic or placeholder section is a section whose content is implicitly defined in the CMS 110, for example, as a set of content parameters that can be used to generate content for the section. The dynamic or placeholder section includes, for example, the set of content parameters, any specified rules or algorithms for generating the dynamic content, the type of content that should be generated (e.g., a specific entity type), a default or fallback content if generating the dynamic content is unsuccessful or if the dynamic content is unavailable, how different types of content (e.g., different entity types) should be displayed, and/or the like. When the web page 200 is requested, the content included in the section is generated and incorporated into the web page 200.

A section reference is a reference to another section, such as a static section included in a different web page. A section reference includes an identifier associated with the referenced section. The content included in the referenced section is retrieved based on the identifier and incorporated in the web page 200. Although dynamic sections and section references are illustrated and discussed separately herein, the generated content for a dynamic section could be one or more references to another section (e.g., dynamically select a pre-existing section to replace a placeholder section) and/or the specific section referenced by a section reference could be dynamically determined instead of pre-selected.

As shown in FIG. 2, web page 200 includes two static sections, section 202 and section 204, one dynamic section, placeholder section 206, and one section reference, section reference 208. The structure of a section corresponds to the number of entities included in the section and the order of the entities included in the section. Each section can have a different structure from the other sections included in web page 200. Additionally, the structure for a dynamic section or a referenced section can be different each time the web page 200 is constructed.

As an example, static section 202 includes an entity 210, an entity 212, an entity reference 214, and a placeholder entity 216, arranged in order such that entity 210 is at the top of section 202 and placeholder entity 216 is at the bottom of section 202. The section structure shown in FIG. 2 is illustrative, and in practice, a section (whether dynamic or static) can include any number of entities, any types of entities, any number of each type of entity (including zero), and/or in any order. Additionally, although FIG. 2 illustrates section 202 having a vertical layout (top to bottom), such that each entity is displayed below a previous entity, a section can have any suitable layout, such as a vertical layout, a horizontal layout, a grid layout, a combination of multiple types of layouts, and/or the like. In some embodiments, the layout of a given section is specified by the editor. In some embodiments, the layout of a given section (whether dynamic or static) is dynamic and is not specified in advanced. Instead, the layout of the section is determined when the web page 200 is constructed.

In some embodiments, a dynamic section, such as placeholder section 206, includes rendering information 218. Rendering information 218 indicates, for each type of entity of a plurality of entity types, how content data for the type of entity should be displayed (e.g., card, carousel, list, grid, and/or the like). Generating content for placeholder section 206 includes generating one or more entities to include in placeholder section 206. Each generated entity is displayed in web page 200 based on the portion of rendering information 218 corresponding to the entity type of the generated entity.

In some embodiments, a given entity can be a static entity, a dynamic or placeholder entity, or an entity reference. A static entity is an entity whose content is explicitly defined in the CMS 110. A static entity could be defined by an editor and/or by the CMS 110. Example entities could be, for example, a video, an image, an article, a gallery (multiple images and/or videos), a feed (list of links), and/or the like. In some embodiments, the content platform 100 provides web pages associated with a media service provider. In such embodiments, entities include entities specific to media content, such as a character, cast member, director, movie summary, episode summary, episode list, a media content item provided by the media service provider, and/or the like. A static entity includes, for example, the content data or information defined for the static entity. Additionally, a static entity could include display information for formatting and displaying the content data, such as font, font size, colors, image or video size, image or video display style, and/or the like. In some embodiments, a static entity includes layout information, such as whether the content should be displayed as a card (single item), list, carousel, grid, and/or the like. The display information included in a static entity can vary depending on the type of entity.

A dynamic or placeholder entity is an entity whose content is implicitly defined in the CMS 110, for example, as a set of content parameters that can be used to generate content for the entity or a reference to a placeholder template for a specific type of placeholder entity. The dynamic or placeholder entity includes, for example, the set of content parameters, any specified rules or algorithms for generating the dynamic content, an entity type, a default or fallback content if generating the dynamic content is unsuccessful or the dynamic content is unavailable, how the content should be displayed, and/or the like. When the web page 200 is requested, the content included in the entity is generated and incorporated into the web page 200.

An entity reference is a reference to another entity, such as a static entity included in a different web page. An entity reference includes an identifier associated with the referenced entity, such as a video identifier, an image identifier, an article identifier, and/or the like. The content included in the referenced entity is retrieved based on the identifier and incorporated in the web page 200. Although dynamic entities and entity references are illustrated and discussed separately herein, the generated content for a dynamic entity could be one or more references to another entity (e.g., dynamically select an article to include in a placeholder article entity) and/or the specific entity referenced by an entity reference could be dynamically determined instead of pre-selected by the editor.

As shown in FIG. 2, section 202 includes two static entities, entity 210 and entity 212, one entity reference, entity reference 214, and one dynamic entity, placeholder entity 216. In some embodiments, in addition to the content data included in an entity, each entity also includes entity information such as an entity type 220 and an entity identifier 222. Entity type 220 indicates a type of entity (e.g., video, image, article, feed, character, cast, placeholder, and/or the like. Entity identifier 222 indicates an identifier associated with the entity. In some embodiments, the identifier associated with a static entity (e.g., entity identifier

222(1)) is a unique identifier that can be used to query and/or retrieve the static entity. A placeholder entity could include no identifier or an identifier that indicates the type of placeholder (e.g., top 10 feed) or other information that is used to generate content for the entity.

In some embodiments, a dynamic entity, such as placeholder entity 216, optionally includes one or more fallback entities 224. The one or more fallback entities specify one or more entities (e.g., entity references) to use if generating the dynamic content is unsuccessful or if the dynamic content is unavailable. For example, the one or more fallback entities could be used if user data for generating personalized content is unavailable (e.g., for a default or guest user). In some embodiments, if no fallback entities are specified, then the dynamic entity is not included in web page 200 if the dynamic content is unable to be generated or is otherwise unavailable.

After an editor has finished specifying the data for a web page, the editor publishes the web page. In response to receiving a request to publish a given web page, the CMS 110 generates CMS data corresponding to the web page. The CMS data can be any suitable data type or format. Generally, the CMS data is of a data format and structure that the CMS 110 uses to deliver a web page to a client device or client application, if the CMS 110 were to deliver the web page. In some embodiments, the CMS data comprises structured JavaScript Object Notation (JSON) data that hierarchically represents the content of the web page.

Ingestion service 120 receives the CMS data generated by CMS 110 for a web page. Ingestion service 120 processes the CMS data to generate a plurality of atomic elements. Each atomic element corresponds to element of the web page or a portion of an element of the web page. A web page element could be, for example and without limitation, the web page itself, a static section, a dynamic or placeholder section, a section reference, a static entity, a dynamic or placeholder entity, an entity reference, content data included in an entity (e.g., text, image, and/or video), and/or the like. In some embodiments, an atomic element corresponds to a given web page element. In some embodiments, a given web page element is further subdivided into multiple atomic elements. For example, content data for an article could be divided into different paragraphs, images, quotes, and/or the like. As another example, a section could be divided into the section structure (number and order of entities), the section layout (how the entities are organized within the section), the section design (how the section appears on the page), and/or the like.

The information associated with a given atomic element differs based on the web page element that corresponds to the given atomic element. For example, referring to FIG. 2, an atomic element corresponding to the web page 200 is associated structural information of the web page 200, such as an ordered list of sections included in web page 200 (e.g., section 202, section 204, placeholder section 206, and section reference 208), display information associated with the web page 200 such as a page theme, and/or the like. An atomic element corresponding to section 202 is associated with the structure of section 202, such as an ordered list of entities included in section 202 (e.g., entity 210, entity 212, entity reference 214, and placeholder entity 216), layout information associated with the section 202 (e.g., one or more specified layout types or dynamic layout), dynamic content generation information (e.g., parameters, rules, algorithms, and/or the like), and/or the like.

In some embodiments, ingestion service 120 parses the CMS data to identify the different elements of the web page and the structure corresponding to each web page element. For example, if the CMS data is organized into a tree structure where each node corresponds to a different web page element, ingestion service 120 could traverse the tree structure to determine the structure of the different web page elements. For example, the child nodes of a given node indicate the web page elements that are included in the web page element corresponding to the given node. Additionally, ingestion service 120 could read the information included in each node to determine the information associated with the web page element corresponding to the node.

In some embodiments, ingestion service 120 generates, based on the plurality of atomic elements, one or more page construction items and one or more page content items. Each page construction item corresponds to data associated with displaying a web page element, such as the structure, layout, display and/or render information, and/or the like. Each page content item corresponds to content data included in a web page element, such as the contents of an article, a video, an image, information associated with a person (e.g., character, cast, crew), and/or other CMS content. In some embodiments, each page construction item or page content item corresponds to a different atomic element. For example, a page construction item could correspond to an atomic element representing the structure and layout of a given entity included in the web page. A page content item could correspond to an atomic element representing the content data included in the given entity. As discussed above, each web page element can be represented using multiple atomic elements. Accordingly, ingestion service 120 can generate multiple page construction items or page content items for a given web page element, depending on the number and/or type of atomic elements corresponding to the web page element.

In some embodiments, to generate a page construction item or a page content item based on an atomic element, ingestion service 120 converts CMS data corresponding to the atomic element into a content platform data format. The content platform data format includes a data structure and/or language that can be used by other elements of the content platform, such as page building engine 150 and API service 160, to process the page construction item or page content item when constructing the web page.

In some embodiments, converting CMS data from a data format associated with CMS 110 to the content platform data format includes generating a data structure corresponding to the atomic element using a domain specific language (DSL). In some embodiments, ingestion service 120 includes a plurality of mappings that map each type of atomic element to a different DSL data structure template. Ingestion service 120 determines, for each atomic element, an element type of the atomic element. Based on the element type of an atomic element and the data structure corresponding to the element type, ingestion service 120 generates a DSL data structure that represents the atomic element. In some embodiments, ingestion service 120 includes a plurality of mappings that maps each type of web page element to one or more different DSL data structure templates. Each data structure template could correspond to a different atomic element associated with the web page element. Additionally, each web page element can be mapped to multiple data structure templates. That is, the plurality of mappings could be used by ingestion service 120 to determine the atomic element(s) that correspond to a given web page element and generate one or more corresponding DSL data structure(s) that represent the given web page element without performing an intermediate step of generating one or more atomic elements from the given web page element.

In some embodiments, a data structure template indicates the information associated with an atomic element that should be included in the data structure and how the included information should be structured. In some embodiments, ingestion service 120 parses the CMS data to identify each piece of information indicated in the data structure template and generates a DSL data structure that contains the identified information. Additionally, in some embodiments, ingestion service 120 generates one or more pieces of information indicated in the data structure template, such as an atomic element type, an identifier associated with the atomic element, and/or the like, that are not included in the CMS data.

As an example, CMS data for a video player could include data indicating that the CMS content is a video, an identifier associated with a preview image, and an identifier associated with video content played using the video player. A data structure template associated with video players could indicate that a page construction item for video players should include the DSL statements "kind: VIDEO_PLAYER ENTITY" and "contentID: [page content item identifier]." Another data structure template associated with video players could indicate that a page content item for video players should include a plurality of data fields, such as the page content item identifier, a video identifier, a preview image identifier, display text associated with the preview image, display text associated with the video, and/or the like. Ingestion service 120 could parse the CMS data based on the data structure templates to obtain the information indicated by the data structure templates (e.g., video identifier and preview image identifier). Additionally, ingestion service 120 could generate a page content item identifier associated with the page content item and use the page content item identifier when generating the page construction item.

In some embodiments, when generating a page construction item or a page content item, if the CMS data includes a reference to external data (e.g., a metadata tag), ingestion service 120 resolves the reference by retrieving the data associated with the reference from the corresponding external data source and incorporating the data in the page construction item or page content item. For example, if content data includes a video title tag, ingestion service 120 could retrieve the video title from a media content server and replace the video title tag with the video title text. In some embodiments, if the CMS data includes a reference to external data, ingestion service 120 includes, in the page construction item or page content item the reference to the external data. The reference could include, for example, the type of data, an identifier associated with the data, a location of a data source, and/or other data that can be used by other components of content platform 100 to retrieve the data.

In some embodiments, ingestion service 120 transmits the one or more page construction items and the one or more content items for the web page to a data service 130. In some embodiments, ingestion service 120 publishes the page construction items and/or the content items to one or more data feeds to which data service 130 is subscribed, and data service 130 obtains the page construction items and/or content items, whichever the case may be, from the one or more data feeds. In some embodiments, data service 130 receives the one or more page construction items for a given web page separately from the one or more content items for the given web page. For example, ingestion service 120 could publish page construction items to a first data feed and content items to a second data feed. Data service 130 reads the page construction items from the first data feed and the content items from the second data feed.

Data service 130 stores the one or more page construction items and one or more content items to a data store 140 as page construction data 142 and page content data 144, respectively. Once the one or more page construction items and the one or more content items are stored in data store 140, the page construction data 142 and the page content data 144 can be queried and/or retrieved by data service 130 in response to requests from other components of content platform 100 (e.g., page construction engine 150 and API service 160). Generally, data service 130 manages the data stored in data store 140, receives requests from other components of content platform 100 for web page data (e.g., page construction data 142 and/or page content data 144), and retrieves page construction items and page content items from data store 140 based on the received requests. The other components of content platform 100 receive web page data stored in data store 140 and/or search results based on the web page data stored in data store 140 from data service 130.

Data store 140 can be included in any suitable data storage device(s) that persistently stores data, such as one or more hard disk drives, solid state storage devices, and/or the like. In some embodiments, data store 140 is included in one or more storage devices accessible to one or more computing devices that are executing data service 130. In some embodiments, data store 140 is included in a one or more networked, cloud, and/or distributed data storage devices or services to which data service 130 has access, for example, via a network (not shown).

Data store 140 can be any suitable data store and can store the page construction items and content items using any suitable approach. For example, data store 140 could be a key-value store, where each page construction item or content item could be stored in conjunction with a corresponding identifier. A page construction item or content item can be retrieved from data store 140 using the corresponding identifier. Additionally or alternatively, data store 140 could store page construction items in association with a web page identifier (e.g., web page URL or slug). One or more page construction items corresponding to a web page can be retrieved from data store 140 using the web page identifier. For example, page construction items for web page 200 can be retrieved from data store 140 using the slug for the web page 200, an internal identifier associated with the web page 200, unique identifiers associated with individual page construction items (e.g., page construction items representing section 202, section 204, entity 210, and so forth), and/or the like.

Page building engine 150 receives page construction items and page content items for a web page from data store 140 (e.g., via data service 130), and constructs the web page based on the page construction items and the page content items. In some embodiments, page building engine 150 receives a request for a web page from API service 160. In response to receiving the request, page building engine 150 requests the page construction items and page content items for the requested web page from data service 130. Data service 130 receives the request, retrieves the requested data from data store 140, and transmits the requested data to page building engine 150. In some embodiments, data service 130 receives a request for web page data from API service 160. Data service 130 transmits the requested data to API service 160 which, in turn, transmits the data to page building engine 150 in conjunction with a request for the constructed web page. In some embodiments, data service 130 transmits the requested data directly to page building engine 150. Additionally, in some embodiments, API service 160 transmits a request for the constructed web page to page building engine 150 in conjunction with transmitting the request for the web page data to data service 130.

In some embodiments, page building engine 150 receives all page construction items and/or all page content items for a given web page at the same time. For example, in response to a request for web page data for the web page, data service 130 retrieves all page construction items and page content items that are stored in association with the web page and transmits the page construction items and page content items to page building engine 150. Page building engine 150 processes each of the received page construction items and page content items to construct the given web page.

In some embodiments, page building engine 150 iteratively requests and receives page construction items and/or page content items for the given web page. For example, in response to a request for web page data for the web page 200, data service 130 retrieves the page construction item corresponding to the web page 200 itself and transmits the page construction item to page building engine 150. Page building engine 150 processes the page construction item to determine the different sections included in web page 200. Page building engine 150 transmits a request to data service 130 for page construction items corresponding to the different sections (e.g., section 202, section 204, placeholder section 206, and section reference 208). Page building engine 150 processes the page construction item for each section to determine the elements (e.g., content items and/or entities) included in the section and transmits a request to data service 130 for page construction items and/or page content items corresponding to the elements. The processing and requesting of data are repeated until page building engine 150 has obtained all the page construction items and all the page content items for the given web page.

In some embodiments, page building engine 150 processes one or more page construction items associated with a web page to determine one or more web page elements and/or one or more atomic elements included in the web page. Additionally, page building engine 150 determines a structure and layout of the web page, such as the order in which the different web page elements and/or atomic elements are included in the web page. Page building engine 150 processes one or more page content items associated with the web page to generate and/or retrieve content data included in the web page. Page building engine 150 applies the structure and layout of the web page to the content data (i.e., places content data at a corresponding location within the web page based on the structure and layout) to generate the web page.

In some embodiments, page building engine 150 iteratively replaces page construction items with corresponding atomic elements (e.g., web page elements and/or web page element content). For example, referring to FIG. 2, the page construction item representing web page 200 indicates the sections included in web page 200 and the order of the sections. Page building engine 150 processes the page construction item to determine the sections and the order of the sections. For each section, page building engine 150 generates a portion of the web page 200 corresponding to the section based on the page construction item(s) representing the section. Page building engine 150 orders the different portions of the web page 200 in accordance with the structure and layout indicated by the page construction item. Additionally, page building engine 150 generates display and/or render information for the web page 200 based on display and/or render information indicated by the page construction item. In some embodiments, one or more of the structure, layout, display, and/or render information are represented by one or more other page construction items. Page building engine 150 requests the one or more other page construction items to determine the structure, layout, display, and/or render information for the web page 200.

In some embodiments, the page construction item representing a static section indicates the entities included in the static section and the order of the entities. To generate the portion of the web page 200 corresponding to a static section, page building engine 150 processes the page construction item to determine the entities and the order of the entities. For each entity, page building engine 150 generates a sub-portion of the web page 200 corresponding to the entity based on the page construction item(s) and/or page content item(s) representing the entity. Page building engine 150 orders the different sub-portions of the web page 200 included in the static section in accordance with the structure and layout indicated by the page construction item. In some embodiments, if the page construction item indicates that the structure and/or layout of the static section is dynamic, then page building engine 150 determines a structure and/or layout for the static section. Determining the structure and/or layout could be based on, for example, one or more structure and/or layout generation parameters indicated in the page construction item, the type of entities included in the section, the number of entities included in the section, and/or the like. In some embodiments, page building engine 150 utilizes one or more rules, algorithms, machine learning models, and/or the like to determine the structure and/or layout of the section.

In some embodiments, the page construction item representing the static section indicates, for a static entity, an identifier of the page content item that corresponds to the content data included in the static entity. To generate the sub-portion of the web page 200 corresponding to a static entity, content data for the static entity is retrieved based on the page content item. The content data for the entity is included in the sub-portion of the web page 200 corresponding to the entity. In some embodiments, the page construction item representing the static section indicates, for a static entity, an identifier of a page construction item that represents the static entity. To generate the sub-portion of the web page 200 corresponding to a static entity, page building engine 150 processes the page construction item to determine the page content item that corresponds to the content data included in the static entity.

In some embodiments, the page construction item representing a dynamic entity indicates one or more content generation parameters for generating the content included in the dynamic entity, such as a target content type, types of user information to use, rules and/or algorithms to use, rules and/or algorithms to avoid, and/or the like. Page building engine 150 applies one or more rules, algorithms, machine learning models, and/or the like to the one or more content generation parameters to generate content data for the entity. In some embodiments, generating content data for a dynamic entity includes determining an entity type of the entity (e.g., article, list, feed, gallery, video, image, and/or the like) and generating the content data based on the entity type. The entity type can be automatically determined or can be indicated in the one or more content parameters. In some embodiments, generating content data for a dynamic entity includes selecting an existing entity from a plurality of existing entities. For example, page building engine 150 could select content data that was defined for an entity included in a different web page to use in place of the dynamic entity. Page building engine 150 requests the page content item(s) associated with the selected entity from data service 130.

In some embodiments, page building engine 150 selects the one or more rules, algorithms, machine learning models, and/or the like based on one or more of the content generation parameters. For example, page building engine 150 could determine, based on the one or more content generation parameters, whether to display a list of articles, a list of videos, or a list of images to the user. Page building engine 150 selects one or more specific rules, algorithms, machine learning models, and/or the like based on whether page building engine 150 determined that a list of articles, a list of videos, or a list of images should be displayed.

In some embodiments, instead of one or more content generation parameters, a page construction item indicates a type of dynamic entity, such as popular articles, trending articles, recommended videos, recommended articles, and/or the like. Page building engine 150 determines, based on the page construction item, the type of dynamic entity. Page building engine 150 identifies one or more rules, algorithms, machine learning models, and/or the like that are associated with the given type of dynamic entity, and generates the content data for the dynamic entity using the identified rules, algorithms, machine learning models, and/or the like. Page building engine 150 can use any suitable approach or techniques to associate different types of dynamic entities with the different mechanisms for generating content for that type of dynamic entity. For example, in some embodiments, page building engine 150 could store a different set of instructions (e.g., functions, programs, modules, and/or the like) in association with each type of dynamic entity. In response to determining that a dynamic entity is of a given type, page building engine 150 executes the set of instructions associated with a given type of dynamic entity to generate content for the dynamic entity.

Additionally, in some embodiments, generating content for a dynamic entity is further based on one or more of: the other entities included in the section in which the dynamic entity is included, other sections included in the web page, other entities included in the other sections of the web page, other content data included in the web page, and/or metadata associated with the web page (e.g., tags, categories, and/or the like). For example, if another entity included in the web page is a dynamic entity that generates a list of popular articles related to a given movie, then page building engine 150 could determine that the generated content should not be based on popular articles related to the given movie. As another example, page building engine 150 could analyze the other content data included in the web page to determine that the web page is related to a given holiday, and that the generating the content should be further based on the given holiday.

In some embodiments, generating content for a dynamic entity includes performing a search for content. For example, if the request for the web page was a request for a search results page for a given search term or phrase, then page building engine 150 performs a search based on the given search term or phrase. Page building engine 150 generates the content for the dynamic entity based on the results of the search. Performing the search could include, for example, sending a request to data service 130 to perform a query for content items that match or are related to the given search term or phrase. Data service 130 performs the query on the page content data 144 in data store 140. The search results could include, for example, a list of page content items that satisfy the query, the page content item(s) that satisfied the query, a list of web pages that include the page content items that satisfy the query, a list of sections of web pages that include the page content items, the page construction item(s) for sections that include the page content items, and/or the like. In some embodiments, generating content for the dynamic entity based on the search results includes processing page content item(s) and/or page construction item(s) associated with the search results, extracting content data from page content item(s), formatting for display within the web page, ranking the search results, and/or the like.

In some embodiments, the page construction item representing a entity reference indicates the identifier and/or other location information associated with the referenced entity. To generate the portion of the web page 200 corresponding to an entity reference, page building engine 150 requests the page construction item corresponding to the referenced entity based on the identifier and/or location information. If the referenced entity is a static entity, then page building engine 150 generates the portion of web page 200 corresponding to the referenced entity in a similar manner to generating a portion of a web page corresponding to a static entity. If the referenced section is a dynamic entity, then page building engine 150 generates the portion of web page 200 corresponding to the referenced section in a similar manner to generating a portion of a web page corresponding to a dynamic entity.

Additionally, in some embodiments, page building engine 150 generates display and/or render information for an entity based on display and/or render information indicated by the page construction item corresponding to the entity. In some embodiments, one or more of the structure, layout, display, and/or render information for an entity are specified in the page construction item corresponding to the section in which the entity is included. Page building engine 150 generates display and/or render information for each entity included in a section based on the information indicated in the page construction item corresponding to the section.

In some embodiments, the page construction item representing a dynamic section indicates one or more content generation parameters for generating the dynamic section, such as a target content type, types of user information to use, rules and/or algorithms to use, rules and/or algorithms to avoid, and/or the like. Page building engine 150 applies one or more rules, algorithms, machine learning models, and/or the like to generate content for the dynamic section based on the one or more content generation parameters. In some embodiments, generating content for a dynamic section includes determining a number of entities to include in the section, an entity type of each entity, and generating the content for each entity included in the section. In some embodiments, generating content for a dynamic section includes selecting an existing section (e.g., a static section) from a plurality of existing sections. For example, page building engine 150 could select a section that is included in a different web page to use in place of the dynamic section. Page building engine 150 requests the page construction item(s) and page content item(s) associated with the selected section from data service 130.

In some embodiments, page building engine 150 selects the one or more rules, algorithms, machine learning models, and/or the like based on one or more of the content generation parameters. Selecting the one or more rules, algorithms, machine learning models and/or the like for generating content can also be performed using one or more different rules, algorithms, machine learning models, and/or the like. Generally, any suitable approach or technique for generating a section based on a set of content generation parameters can be used.

In some embodiments, instead of one or more content generation parameters, a page construction item indicates a type of dynamic section, such as a cast and/or crew section, a summary section, a related content section, a biography section, a characters section, and/or the like. Page building engine 150 determines, based on the page construction item, the type of dynamic section. Page building engine 150 identifies one or more rules, algorithms, machine learning models, and/or the like that are associated with the given type of dynamic section, and generates the entities and/or content data for the dynamic section using the identified rules, algorithms, machine learning models, and/or the like. Page building engine 150 can use any suitable approach or techniques to associate different types of dynamic sections with different mechanisms for generating entities and/or content for that type of dynamic section. For example, in some embodiments, page building engine 150 could store a different set of instructions (e.g., functions, programs, modules, and/or the like) in association with each type of dynamic section. In response to determining that a dynamic section is of a given type, page building engine 150 executes the set of instructions associated with the given type of dynamic section to generate the entities and/or content for the dynamic section.

Additionally, in some embodiments, generating entities and/or content for a dynamic section is further based on one or more of: the other sections included in the web page, the entities included in the other sections of the web page, other content data included in the web page, and/or metadata associated with the web page (e.g., tags, categories, and/or the like). For example, if another section included in the web page is a dynamic section that generates a summary for the web page, then page building engine 150 could determine that the generated content should not include a summary of the web page. As another example, page building engine 150 could analyze the tags associated with the web page to determine that the web page is related to a given movie, and that the generating the content should be further based on the given movie.

In some embodiments, the page construction item representing a section reference indicates the identifier and/or other location information associated with the referenced section. To generate the portion of the web page 200 corresponding to a section reference, page building engine 150 requests the page construction item corresponding to the referenced section based on the identifier and/or location information. If the referenced section is a static section, then page building engine 150 generates the portion of web page 200 corresponding to the referenced section in a similar manner to generating a portion of a web page corresponding to a static section. If the referenced section is a dynamic section, then page building engine 150 generates the portion of web page 200 corresponding to the referenced section in a similar manner to generating a portion of a web page corresponding to a dynamic section.

Additionally, in some embodiments, page building engine 150 generates display and/or render information for a section based on display and/or render information indicated by the page construction item corresponding to the section. For example, page building engine 150 could apply a theme (e.g., set of font styles, font colors, background color) to the portion of the web page corresponding to the section based on the display and/or render information. In some embodiments, the page construction item includes rendering information that indicates how different entity types should be rendered or displayed in the web page. For each entity included in the section, page building engine 150 applies the corresponding rendering information to the entity. In some embodiments, one or more of the structure, layout, display, and/or render information for a section are represented by one or more other page construction items. Page building engine 150 requests the one or more other page construction items to determine the structure, layout, display, and/or render information for the section.

In some embodiments, if the content data included in the constructed web page includes one or more data references, page building engine 150 resolves the one or more data references. For each data reference, page building engine 150 retrieves the data associated with the data reference and replaces the data reference with the retrieved data. In some embodiments, to retrieve the data associated with a data reference, page building engine 150 identifies a data source specified by the data reference. In some embodiments, page building engine 150 determines a type of data (e.g., video metadata, person metadata, image metadata, and/or the like) referenced by the data reference. Page building engine 150 determines, based on the type of data, a data source for the type of data. For example, a first data source could store video metadata, a second data source could store person metadata, and so forth. If the data reference is for data associated with a video, then page building engine 150 retrieves the referenced data from the first data source. If the data reference is for data associated with a person, then page building engine 150 retrieves the referenced data form the second data source. In some embodiments, data references are to a single data source. The data reference includes an identifier associated with the referenced data. Page building engine 150 retrieves the referenced data from the single data source based on the identifier. For example, in the context of a media service provider content platform, the data source for data reference could be a data store that includes metadata associated with a media content library of the media service provider and/or the media content library itself.

API service 160 is configured to receive requests for web pages from user devices. In some embodiments, in response to receiving a request for a web page, API service 160 transmits a request to page building engine 150 to construct the web page. In some embodiments, in response to receiving the request for the web page, API service 160 transmits a request to data service 130 for the web page instead of, or in addition to, transmitting the request to page building engine 150. In some embodiments, in response to the request to data service 130 for the web page, API service 160 receives one or more page construction items and/or one or more page content items associated with the web page from data service 130. API service 160 transmits the one or more page construction items and/or the one or more page content items, whichever the case may be, to page building engine 150.

API service 160 receives the constructed web page from page building engine 150 and transmits the constructed web page to the user device that requested the web page. In some embodiments, API service 160 performs one or more processing operations on the constructed web page received from page building engine 150 prior to transmitting the constructed web page to the user device. In some embodiments, API service 160 is configured to communicate with other services, applications, and computing devices that are external to content platform 100. In such embodiments, API service 160 is configured to perform one or more processing operations that involve external communications, such as retrieving external data from one or more external data sources. For example, API service 160 could perform the data resolution functions described above with respect to page building engine 150 instead of, or in addition to, page building engine 150.

Although FIG. 1 illustrates each of CMS 110, ingestion service 120, data service 130, data store 140, page building engine 150, and API service 160 in content platform 100 as a single entity, any component of content platform 100 could be a collection of multiple components working in cooperation to perform the functionality described herein. For example, page building engine 150 could include separate components for generating the web page, generating the different types of dynamic content included in the web page, processing search results, and/or the like. As another example, data store 140 could include a first data store for storing page construction data 142 and a second data store for storing page content data 144.

One benefit of the above techniques is that generating dynamic content based on individual page construction items enables the personalization of content to be controlled at different levels of granularity within a web page. Additionally, personalized content and types of dynamically generated content can be mixed with static content at the different levels of granularity. For example, only specific sections or entities within a section could include dynamically generated content, while the remaining sections and/or entities include static content that was defined by an editor. If a page construction item corresponded to a lower level of granularity, then the personalization could also be performed at the lower level of granularity. For example, the contents of an article could include one or more paragraphs of static text and one or more paragraphs of dynamically generated text. Because the editor defines the dynamic portions of the web page when creating the web page and the web page is constructed based on the definitions provided by the editor, the editor can easily predict and control the amount, location, appearance, and granularity of personalized content and other types of dynamically generated content in the constructed page.

An additional benefit of the above techniques is that by separating the dynamic content definition (e.g., page construction items) from the rules, algorithms, machine learning models, and/or other mechanisms used to generate the dynamic content, the underlying rules, algorithms, machine learning models, and such can be modified or updated without having to make any changes to any of the page construction items, page content items, or other web page definition data or having to regenerate the page construction items and/or page content items.

Another benefit of the above techniques is that references to other content within a given web page, such as external data, external images, and content included in other web pages, enable changes to the other content to be reflected in the given web page without having to make any changes to the given web page. As a result, the content and data included in different web pages is updated more efficiently and updates are applied more consistently across multiple web pages compared to updating the content and data in each web page individually.

Although examples are described herein with respect to web pages, the disclosed techniques can be used to generate personalized content interfaces for display in any type of web-based application, including browsers, mobile device applications, television applications, and/or the like. For example, in some embodiments, page building engine 150 constructs an application interface based on the page construction items and page content items for a web page. In some embodiments, the format and/or type of the content interface generated by page building engine 150 is based on the type of request received by API service 160. For example, page building engine 150 could be configured to construct a web page for display in a browser in response to API service 160 determining that the request for the web page is from a browser, and construct an application interface for display in a mobile application in response to API service 160 determining that the request for the web page is from a mobile application.

Personalization of Web-Based Content

Figure 3:
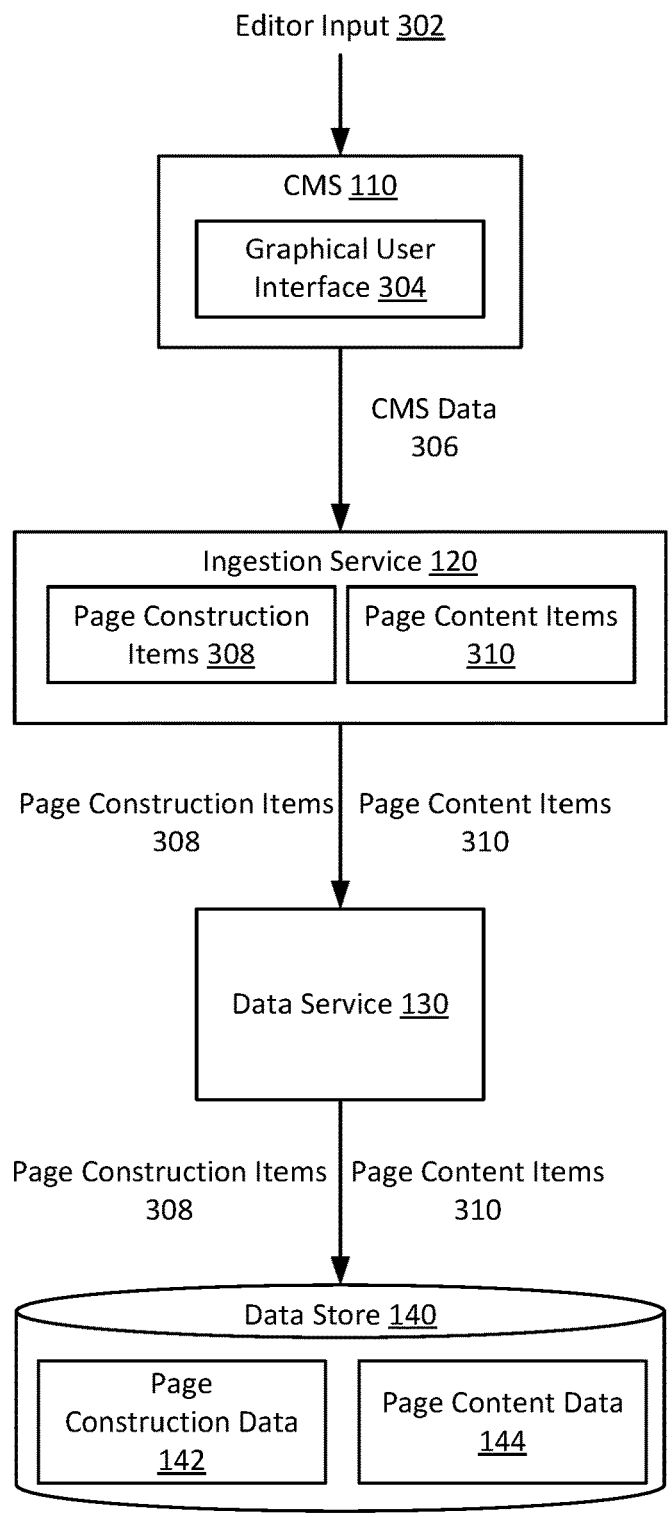
FIG. 3 is a block diagram illustrating data flows for processing web page data using a content platform of FIG. 1, according to various embodiments.

FIG. 3 is a block diagram illustrating data flows for processing web page data using a content platform 100 to enable personalization of a web page, according to various embodiments. As shown in FIG. 3, CMS 110 receives editor input 302 from an editor. The editor input 302 could be received, for example, via a graphical user interface 304 included in the CMS 110. In some embodiments, CMS 110 receives the editor input 302 from an editor computing device (not shown). For example, CMS 110 could provide the graphical user interface 304 via a web application or other web-based interface.

In some embodiments, the editor input 302 indicates the elements included in a web page, the content that is included in each web page element, and any metadata associated with the web page and/or the web page content. The graphical user interface 304 can be used to guide the editor input 302 provided by the editor. For example, if the editor is generating a web page based on a template page, the graphical user interface 304 indicates the web page elements included in the template page and provides data fields for defining the content data for each web page element. As another example, the graphical user interface 304 could prompt the user to enter tags, categories, and other metadata associated with the web page that can be used to search and sort web pages, or used as inputs when generating dynamic content for the web page.

Based on the editor input 302, CMS 110 generates CMS data 306 corresponding to the web page. In some embodiments, the CMS data 306 includes web page data in a data format and structure that the CMS 110 uses to deliver a web page to a client device or client application, if the CMS 110 were to deliver the web page.

CMS 110 transmits the CMS data 306 to an ingestion service 120. Ingestion service 120 transforms the web page data included in CMS data 306 into different DSL data structures that can be processed by other components of content platform 100, such as page building engine 150, when the other components are used to deliver the web page to a client device or client application. As shown in FIG. 3, ingestion service 120 processes the CMS data 306 to generate one or more page construction items 308 and one or more page content items 310. Each page construction item 308 and page content item 310 corresponds to a different element of the web page or a portion of an element of the web page. In some embodiments, a page construction item 308 represents the structure of a web page element, such as the web page as a whole, a section included in the web page, an entity included in the section, and/or the like. In some embodiments, a different page construction item 308 is used to represent each of the structure, layout, design information, and/or the like for a web page element. In some embodiments, a page content item 310 represents the content data included in a web page element or a portion of a web page element, such as text, image, video, web code, and/or the like. In some embodiments, if the content data for a given web page element includes multiple text, image, video, code, and/or other content, a different page construction item 308 is used to represent each different piece of content.

In some embodiments, ingestion service 120 parses the CMS data 306 to identify a plurality of web page elements that are defined in the CMS data 306. For each web page element, ingestion service 120 generates one or more page construction items 308 based on the structure, layout, display information, and/or other non-content information associated with the web page element. Additionally, if the web page element includes content data, ingestion service 120 generates one or more page content items 310 based on the content data.

As an example, if a given web page element includes other web page elements, then ingestion service 120 includes references to the page construction items 308 corresponding to each of the other web page elements in the page construction item 308 for the given web page element. As another example, if a web page element is a dynamic section or a dynamic element, then ingestion service 120 includes information associated with generating content for the dynamic section or dynamic element, such as one or more content generation parameters, type of dynamic content (e.g., dynamic section type, dynamic element type, and/or the like), and/or the like.

In some embodiments, ingestion service 120 includes a plurality of DSL templates. Each DSL template corresponds to a different type of web page element. A DSL template specifies the structure, content, and DSL syntax of a page construction item 308 or a page content item 310 for web page elements of the type corresponding to the DSL template. For example, a DSL template corresponding to a video web page element indicates that the page content item 310 includes the DSL data elements "type: video" and "id: [identifier]." When generating a page content item 310 for a video web page element, ingestion service 120 generates, based on the DSL template, the DSL data element "type: video" to indicate that the web page element is a video. Additionally, ingestion service 120 could determine, based on the DSL template, that an identifier associated with the video should be included in the page content item 310. Ingestion service 120 parses CMS data 306 to determine the identifier associated with the video and uses the identifier to complete the "id: [identifier]" DSL data element indicated by the DSL template. For example, if ingestion service 120 determines that the video identifier is "4567," ingestion service generates the DSL data element "id: 4567."

In some embodiments, ingestion service 120 determines, for each identified web page element, the element type of the identified web page element. Ingestion service 120 determines one or more DSL templates corresponding to the element type of the identified web page element. For each DSL template, ingestion service 120 generates a page construction item 308 or a page content item 310 based on the DSL template and the portion of CMS data 306 corresponding to the identified web page element. For example, if the DSL template includes a DSL data element that is based on a specific piece of information associated with the identified web page element, ingestion service 120 parses or searches the CMS data 306 to obtain the specific piece of information and uses the information to generate the DSL data element.

One benefit of the above approach is that a new type of web page element can be added to content platform 100 by adding one or more new DSL templates corresponding to the new type of web page element to ingestion service 120. As a result, content platform 100 can be easily extended or updated to transform different types of web page elements from a CMS data format into the DSL without having to rewrite or reprogram the ingestion service 120.

In some embodiments, ingestion service 120 transmits the one or more page construction items 308 and the one or more content items 310 to a data service 130. In some embodiments, ingestion service 120 transmits the one or more page construction items 308 separately from the one or more content items 310. In some embodiments, ingestion service 120 publishes the one or more page construction items 308 and the one or more page content items 310 to one or more data feeds to which data service 130 is subscribed. Data service 130 monitors the one or more data feeds and reads the published data to obtain the one or more page construction items 308 and one or more page content items 310. In some embodiments, ingestion service 120 publishes the one or more page construction items 308 to a data feed for page construction data and publishes the one or more page content items 310 to a data feed for page content data.

Data service 130 stores the one or more page construction items 308 and the one or more page content items 310 to a data store 140. The one or more page construction items 308 are stored in data store 140 as page construction data 142 and the one or more page content items are stored in data store 140 as page content data 144. In some embodiments, data service 130 stores the one or more page construction items 308 to a first data store 140 that stores page construction data 142, and stores the one or more page content items 310 to a second data store 140 that stores page content data 144.

Once the one or more page construction items and the one or more content items are stored in data store 140, the one page construction items and the content items can be queried and/or retrieved by data service 130 in response to requests from other components of content platform 100 (e.g., page construction engine 150 and API service 160).

Figure 4:
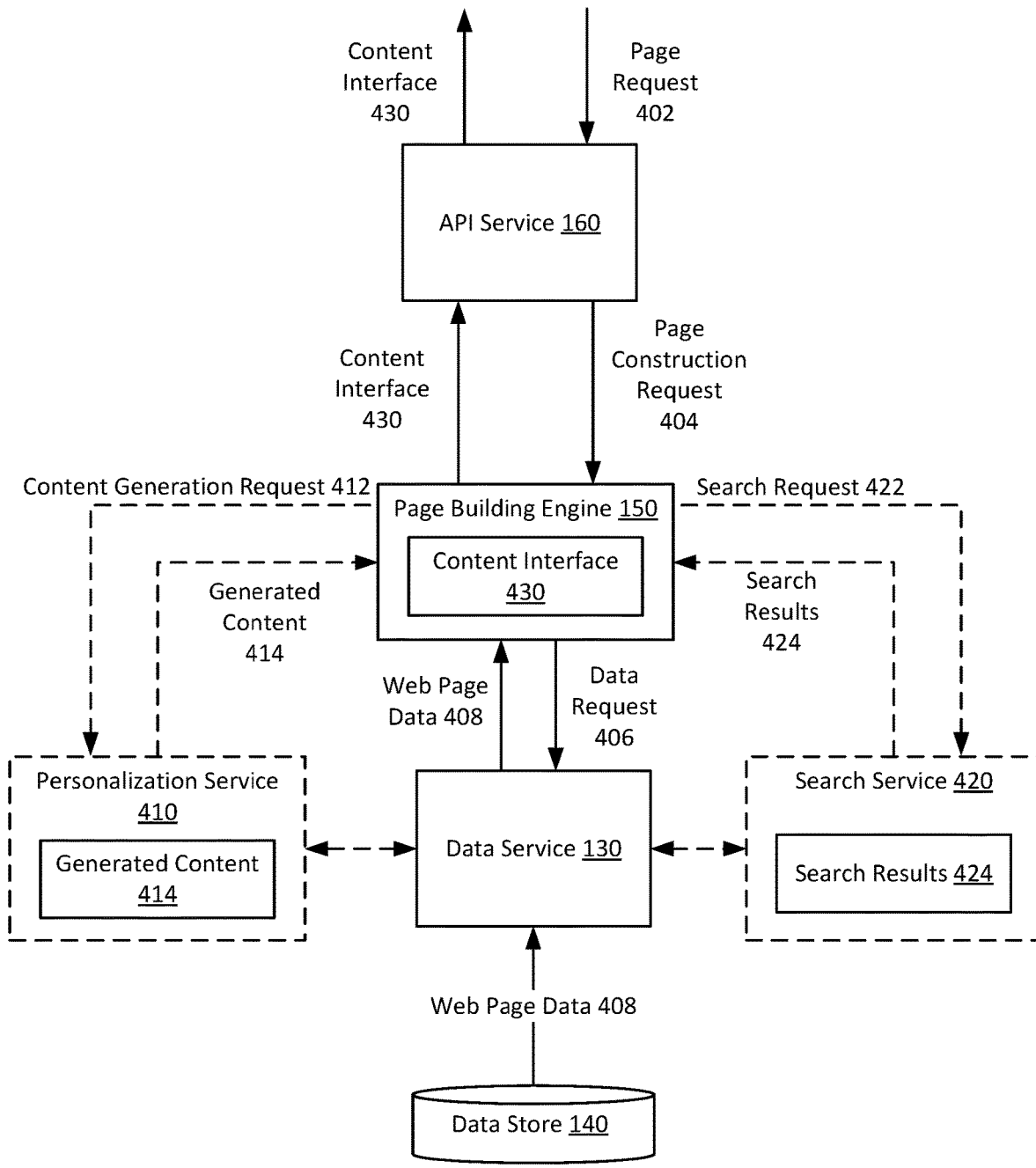
FIG. 4 is a block diagram illustrating data flows for generating a personalized content interface associated with a requested web page using a content platform of FIG. 1, according to various embodiments.

FIG. 4 is a block diagram illustrating data flows for generating a personalized content interface associated with a requested web page using a content platform 100, according to various embodiments. As shown in FIG. 4, an API service 160 receives a page request 402. In some embodiments, API service 160 receives the page request 402 from a client computing device. The page request 402 could be from, for example, a browser or other client application executing on the client computing device.

In some embodiments, if the client computing device, browser, and/or client application are associated with a specific user, the page request 402 includes data indicating the specific user, such as a user identifier. API service 160 retrieves and/or receives data associated with the specific user, such as user profile information, preferences, activity history, and/or other information that can be used to personalize content for the specific user.

API service 160 transmits a page construction request 404 to a page building engine 150. In some embodiments, the page construction request 404 includes an identifier associated with the page request 402, such as a URL or URL slug of the requested web page. In some embodiments, the page construction request 404 includes user data, such as an identifier of the user associated with the page request 402 and/or data associated with the user that was retrieved by API service 160.

Page building engine 150 receives the page construction request 404 and transmits a data request 406 to data service 130 for web page data associated with the requested web page. In some embodiments, the data request 406 specifies the web page identifier included in page construction request 404.

Data service 130 receives the data request 406 and retrieves web page data 408 from data store 140 based on the data request 406. For example, data service 130 could query data store 140 for page construction data 142 and/or page content data 144 that are associated with an identifier included in the data request 406. The web page data 408 includes one or more page construction items and/or one or more page content items. Data service 130 transmits the web page data 408 to page building engine 150.

In some embodiments, based on the data request 406, data service 130 retrieves all page construction items and page content items that are associated with the requested web page. In some embodiments, based on the data request 406, data service 130 retrieves a first page construction item that represents the overall structure of the requested web page. Page building engine 150 processes the first page construction item and transmits a second data request 406 for page construction items and/or page content items corresponding to web page elements specified by the first page construction item. As an example, the first page construction item could specify one or more sections included in the requested web page. The second data request 406 could be for one or more page construction items representing the one or more sections specified by the first page construction item. Data service 130 receives the second data request 406 and retrieves the one or more page construction items from data store 140 based on the second data request 406. Data service 130 transmits the one or more page construction items as web page data 408 to page building engine 150. Page building engine 150 continues to process the web page data 408 and generate additional data requests 406 until page building engine 150 has processed all page construction items and page content items associated with the requested web page.

Page building engine 150 receives one or more sets of web page data 408 and generates a content interface 430 corresponding to the requested page based on the page construction items and the page content item included in the one or more sets of web page data 408. Content interface 430 can be any suitable interface for displaying web-based content, such as a native web page, a mobile application interface, a television application interface, and/or other application interface. In some embodiments, generating the content interface 430 includes processing each page construction item or page content item associated with the requested web page to generate a corresponding portion of the content interface 430. Page building engine 150 combines the different portions of the content interface 430 in accordance with the structure specified by the page construction items. In various embodiments, page building engine 150 can use any feasible approach or technique to combine different portions of the web page to generate the content interface 430.

In some embodiments, page building engine 150 processes web page data 408 in a hierarchical manner. For example, in some embodiments, page building engine 150 processes page construction items and page content items for the requested web page in a top-down manner. Page building engine 150 first processes the page construction item representing the structure of the web page. Page building engine 150 then processes the page construction items representing the sections included in the web page. Page building engine 150 next processes the page construction items representing the entities included in each section included in the web page. Finally, page building engine 150 processes the page content items representing the content included in each entity of each section. At each level, page building engine 150 replaces an atomic element (e.g., web page element or portion of a web page element) specified in the previous level with web page data generated at the current level.

As an example, at the top level, page building engine 150 generates a web page that includes the sections specified in the page construction item representing the structure of the web page and in an order specified in the page construction item. The sections do not include any structure or content (i.e., do not include any entities or content data). Page building engine 150 processes the page construction item representing the structure of the section and generates a portion of the web page corresponding to the section that includes the entities specified in the page construction item representing the structure of the section and in an order specified in the page construction item. Page building engine 150 replaces the section in the web page with the generated portion of the web page that includes the entities. After this step is performed for each section included in the web page, the web page includes multiple sections that each include one or more entities. The process is repeated for each entity included in each section to generate sub-portions of the web page that includes the content for the entity, until the content interface 430 has been populated with content.

In some embodiments, when processing a given page construction item, if the page construction item corresponds to dynamic content, then page building engine 150 generates dynamic content based on the information specified by the page construction item. In some embodiments, if the page construction item corresponds to dynamic content, then page building engine 150 transmits a request to one or more other components of content platform 100 that generate dynamic content. In some embodiments, page building engine 150 determines a type of dynamic content and identifies a component for generating the dynamic content. For example, personalization service 410 could be configured to generate dynamic content that is personalized for individual users (e.g., based on data associated with the user that requested the web page) while page building engine 150, search service 420, and/or another component (not shown) are configured to generate dynamic content that is based on other parameters (e.g., popular, trending, related to the content included in the web page, and so forth). In various embodiments, personalization service 410, page building engine 150, and any other component(s) that generate dynamic content can use any suitable approaches, techniques, and/or algorithms to generate dynamic content.

As shown in FIG. 4, page building engine 150 transmits a content generation request 412 to a personalization service 410. In response to receiving a content generation request 412, personalization service 410 generates dynamic content 414 based on the content generation request 412. In some embodiments, the content generation request 412 includes one or more content generation parameters that were specified in the page construction item representing the dynamic element (e.g., dynamic section or dynamic entity). In some embodiments, the content generation request 412 further includes data associated with a user, such as data that page generation engine 150 received from API service 160. In some embodiments, the content generation request 412 includes an identifier associated with a user, and personalization service 410 is configured to retrieve data associated with the user based on the identifier. Retrieving the data can be further based on specific types of input data needed to generate the dynamic content. For example, if personalization service 410 determines that the dynamic content 414 is generated based on which media content items were previously viewed by a user, personalization service 410 requests or retrieves viewing history data associated with the user.

Optionally, in some embodiments, personalization service 410 communicates with data service 130 to receive web page data associated with the requested web page. For example, in some embodiments, data service 130 transmits a page construction item representing dynamic content directly to personalization service 410. Personalization service 410 generates the dynamic content 414 without waiting for a request from page building engine 150. As another example, in some embodiments, personalization service 410 requests content data and/or metadata associated with the requested web page. Personalization service 410 uses the requested content data and/or metadata when generating the dynamic content 414. For example, personalization service 410 could request the content data included in the requested web page and process the content data to determine a specific topic associated with the requested web page. Personalization service 410 generates dynamic content 414 that is targeted towards the specific topic.

After generating the dynamic content 414, personalization service 410 transmits the generated content 414 to page building engine 150. Page building engine 150 includes the generated content 414 in the content interface 430.

Additionally, as shown in FIG. 4, page building engine 150 transmits a search request 422 to search service 420. In some embodiments, the page request 402 includes one or more search parameters, and API service 160 includes the one or more search parameters in the page construction request 404. Page building engine 150 includes the one or more search parameters in the search request 422. In response to receiving the search request 422, search service 420 performs a search based on the one or more search parameters. In some embodiments, search service 420 generates a query for data store 140 based on the one or more search parameters. For example, in some embodiments, search service 420 translates the one or more search parameters into a query that is specified using the DSL. In some embodiments, search service 420 transmits the query to data service 130, which executes the query on data store 140 to generate a set of search results 424. In some embodiments, search service 420 queries data store 140 directly to generate the set of search results 424.

After generating the set of search results 424, search service 420 transmits the search results 424 to page building engine 150. Page building engine 150 includes the search results 424 in the content interface 430.

After page building engine 150 finishes generating the content interface 430, page building engine transmits the content interface 430 to API service 160. API service 160 transmits the content interface 430 to the client computing device from which the page request 402 was received.

In some embodiments, if the content data included in content interface 430 includes one or more data references, page building engine 150 resolves the one or more data references prior to transmitting the constructed page 430 to API service 160. For each data reference, page building engine 150 retrieves the data associated with the data reference and replaces the data reference with the retrieved data. In some embodiments, page building engine 150 transmits an initial content interface 430 to API service 160. The initial content interface 430 includes one or more data references that have not been resolved. API service 160 resolves the one or more data references included in the initial content interface 430 to generate a finalized content interface 430. API service 160 transmits the finalized content interface 430 to the client computing device.

Figure 5:
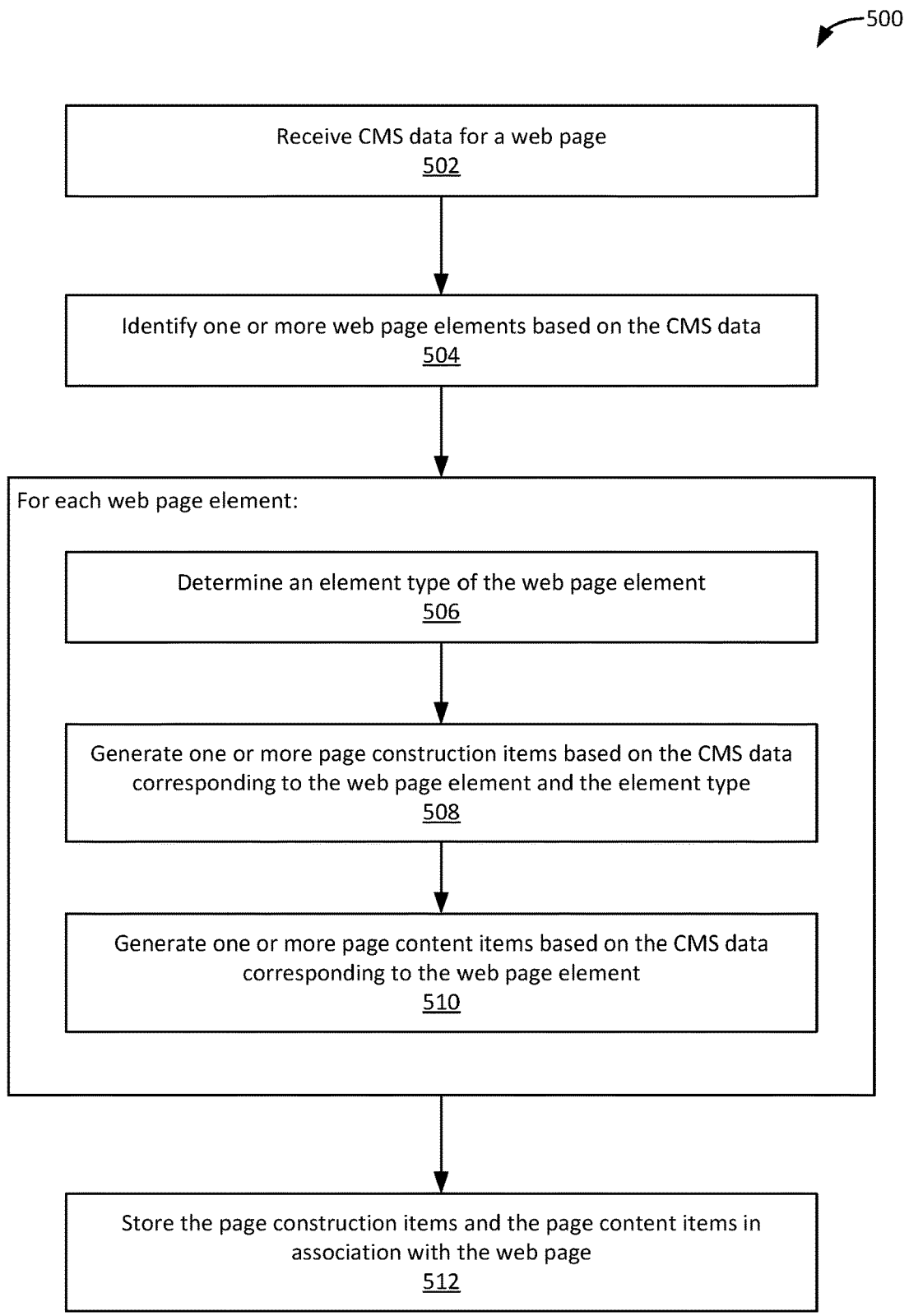
FIG. 5 is a flowchart of method steps for processing web page data using a content platform, according to various embodiments.

FIG. 5 is a flowchart of method steps for processing web page data using a content platform 100, according to various embodiments. Although the method steps are described with reference to the systems of FIGS. 1-4, persons skilled in the art will understand that any system configured to implement the method steps, in any order, falls within the scope of the present invention.

As shown in FIG. 5, a method 500 begins at step 502, where a content platform receives CMS data for a web page. For example, an ingestion service 120 of content platform 100 receives CMS data 306 from a CMS 110. The CMS data 306 includes web page data in a data format and structure associated with the CMS 110. The CMS data 306 defines a plurality of web page elements in the web page, including the structure, layout, design, and content of each web page element.

At step 504, the content platform identifies one or more web page elements included in the web page based on the CMS data. For example, ingestion service 120 identifies one or more web page elements based on CMS data 306. Identifying the web page elements included in a web page based on CMS data for the web page is performed in a manner similar to that discussed above with respect to ingestion service 120. In some embodiments, the content platform parses the CMS data to identify web page elements defined in the CMS data.

In some embodiments, the one or more web page elements include web page element that correspond to structural elements of the web page, such as the web page itself, a static section, a dynamic or placeholder section, a section reference, a static entity, a dynamic or placeholder entity, an entity reference, and/or the like. Accordingly, a web page element can include or encompass other web page elements. In some embodiments, the one or more web page elements include web page elements that correspond to content data included in the web page (e.g., text, image, and/or video) or a portion thereof. In some embodiments, the one or more web page elements include web page elements that correspond to other attributes of the web page, such as layout information, display information, and/or the like associated with the web page, a section included in the web page, an entity included in the web page, and/or the like.

At step 506, the content platform determines an element type of a web page element included in the one or more web page elements. In some embodiments, determining an element type includes analyzing a portion of the CMS data corresponding to the web page element. For example, the content platform could determine the element type based on one or more of a location of the web page element within a hierarchical structure (e.g., whether the web page element corresponds to a root node, a parent node, a leaf node), the types of information included in the CMS data for the web page element (e.g., content data, metadata, field names, parameters, and/or the like), a context surrounding the CMS data for the web page element (e.g., CMS data for other web page elements), and/or the like.

At step 508, the content platform generates one or more page construction items based on the CMS data corresponding to the web page element and the element type. For example, ingestion service 120 generates one or more page construction items 308 corresponding to a web page element. Generating the one or more page construction items

308 is performed in a manner similar to that discussed above with respect to ingestion service 120.

In some embodiments, generating the one or more page construction items includes converting CMS data from the data structure, format, and language used by the CMS to a data structure, format, and language used by the content platform. For example, each page construction item could be defined using a DSL associated with the content platform.

In some embodiments, the content platform includes a plurality of page construction item templates. Each element type corresponds to one or more page construction item templates included in the plurality of page construction item templates. In some embodiments, each template is defined using the DSL associated with the content platform and indicates the structure, content, and syntax used for a page construction item corresponding to the element type.

In some embodiments, the content platform selects one or more page construction item templates from the plurality of page construction item templates based on the element type of the web page element. For each template, the content platform generates a page construction item based on the template and the portion of CMS data corresponding to the web page element. For example, if the template indicates that the page construction item should include a specific piece of information associated with the web page element, content platform processes the CMS data to obtain the specific piece of information and includes the information in the page construction item.

At step 510, the content platform generates one or more page content items based on the CMS data corresponding to the web page element. For example, ingestion service 120 generates one or more page content items 310 corresponding to a web page element. Generating the one or more page content items 310 is performed in a manner similar to that discussed above with respect to ingestion service 120.

In some embodiments, the content platform processes the CMS data corresponding to the web page element to determine whether the CMS data includes any content data. The content platform generates, for each piece of content data, one or more page content items that represent the content data. In some embodiments, the content platform generates a single page content item for each piece of content data. In some embodiments, the content platform divides each piece of content data into one or more portions and generates a different page content item for each portion. For example, content platform could divide content data that includes multiple text paragraphs into multiple portions, where each portion corresponds to a different paragraph. As another example, content platform could divide content data that includes multiple types of content into multiple portions, where each portion is a contiguous portion of content data having the same type.

In some embodiments, generating the one or more page content items includes converting CMS data from the data structure, format, and language used by the CMS to a data structure, format, and language used by the content platform. For example, each page content item could be defined using a DSL associated with the content platform.

In some embodiments, the content platform includes a plurality of page content item templates. Each content type corresponds to one or more page content item templates included in the plurality of page content item templates. In some embodiments, each template is defined using the DSL associated with the content platform and indicates the structure, content, and syntax used for a page content item corresponding to the content type.

In some embodiments, the content platform selects one or more page content item templates from the plurality of page content item templates based on the content type of a given piece of content data and/or a given portion of the piece of content data. For each template, the content platform generates a page content item based on the template and the portion of CMS data corresponding to the content data. For example, if the template indicates that the page content item should include a specific piece of information associated with the web page content, content platform processes the CMS data to obtain the specific piece of information and includes the information in the page content item.

As shown in FIG. 5, the above steps 506-510 are performed for each web page element included in the one or more web page elements.

At step 512, the content platform stores the page construction items and the page content items in association with the web page. For example, data service 130 stores one or more page construction items 308 and one or more page content items 310 in a data store 140. Storing the page construction items and the page content items is performed in a manner similar to that discussed above with respect to data service 130 and data store 140.

In some embodiments, an ingestion service (e.g., ingestion service 120) transmits the one or more page construction items and the one or more page content items to a data service (e.g., data service 130). In some embodiments, the data service subscribes to one or more data feeds to which an ingestion service publishes page construction items and page content items. The data service receives the one or more page construction items and the one or more page content items and stores the one or more page construction items and the one or more page content items to a data store.

In some embodiments, the content platform stores the page construction items with the page content items. In some embodiments, the content platform stores the page construction items in a separate data store from the page content items.

In some embodiments, the content platform stores each page construction item and page content item with an identifier associated with the web page. The identifier is used by client devices and applications when requesting the web page from content platform. The content platform can use the identifier associated with the web page to retrieve the page construction items and the page content items for the web page from the data store. Additionally, in some embodiments, the content platform stores each page construction item with a page construction item identifier and stores each page content item with a page content item identifier. The content platform can use the identifiers to retrieve specific page construction items and/or specific page content items.

Figure 6:
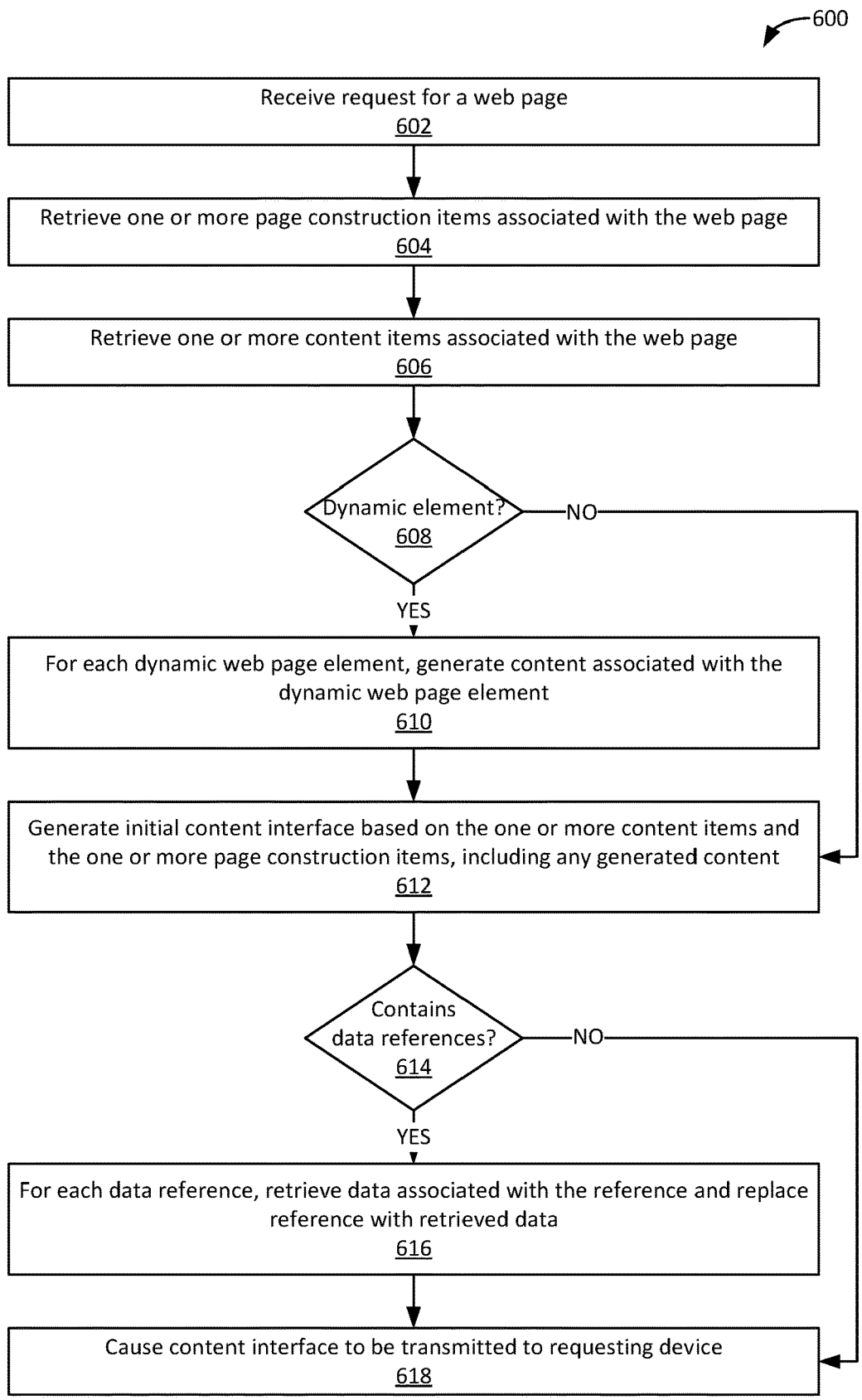
FIG. 6 is a flowchart of method steps for generating personalized content interfaces using a content platform, according to various embodiments.

FIG. 6 is a flowchart of method steps for generating personalized content interfaces using a content platform 100, according to various embodiments. Although the method steps are described with reference to the systems of FIGS. 1-4, persons skilled in the art will understand that any system configured to implement the method steps, in any order, falls within the scope of the present invention.

As shown in FIG. 6, a method 600 begins at step 602, where a content platform receives a request for a web page. The request could be, for example, from a browser or other client application executing on a client computing device. For example, API service 160 receives a page request 402 from a client computing device. In some embodiments, the request includes an identifier that identifies the requested web page.

In some embodiments, the request for the web page is associated with a specific user. For example, a user could be logged into a client application associated with the content platform, and the request could include information that identifies the user, such as a user identifier, email address, and/or the like.

In some embodiments, the request is for a web page of search results for a search query. The request includes the search query and/or one or more parameters associated with the search query, such as one or more search terms, search filters, result ranking methods (e.g., most relevant, most popular, newest, and so forth), and/or the like.

At step 604, the content platform retrieves one or more page construction items associated with the web page. For example, data service 130 retrieves web page data 408 associated with the web page that includes one or more page construction items. Retrieving the one or more page construction items is performed in a manner similar to that discussed above with respect to page building engine 150 and data service 130.

In some embodiments, the content platform retrieves all page construction items that are associated with the web page. For example, data service 130 could retrieve all page construction items included in page construction data 142 that are associated with the identifier for the web page.

In some embodiments, the content platform retrieves a page construction item that represents the overall structure of the web page. The page construction item specifies one or more web page elements included in the web page. The content platform identifies, based on the page construction item, the one or more web page elements. The content platform subsequently retrieves one or more page construction items that represent the one or more web page elements. The content platform retrieves one or more additional page construction items based on each of the subsequently retrieved page construction items, and so forth, until the page construction items do not specify any additional web page elements and/or specify only web page elements that correspond to web page content. In some embodiments, a page construction item specifies that a web page element includes another web page element by including an identifier associated with the page construction item that represents the other web page element. In some embodiments, if a page construction item specifies a reference to a web page element included in another web page, then the content platform also retrieves one or more page construction items corresponding to the referenced web page element.

At step 606, the content platform retrieves one or more page content items associated with the web page. For example, data service 130 retrieves web page data 408 associated with the web page that includes one or more page content items. Retrieving the one or more page construction items is performed in a manner similar to that discussed above with respect to page building engine 150 and data service 130.

In some embodiments, the content platform retrieves all page content items that are associated with the web page. For example, data service 130 could retrieve all page content items included in page content data 144 that are associated with the identifier for the web page.

In some embodiments, the content platform retrieves each page content item while processing the one or more page construction items at step 606. For example, if a given page construction item specifies that the web page element corresponding to the given page construction item includes a given piece of content, then content platform retrieves the page content item that represents the given piece of content.

In some embodiments, a page construction item specifies that a web page element includes a given piece of content by including an identifier associated with the page content item that represents the given piece of content. In some embodiments, if a given page content item includes a reference to another page content item, then the content platform also retrieves the referenced page content item from the data store.

At step 608, the content platform determines whether any of the page construction items correspond to a dynamic web page element. A dynamic element could be, for example, a dynamic section or a dynamic entity. In some embodiments, each page construction item includes data indicating a type of the web page element represented by the page construction item. The content platform determines whether any of the element types indicated by the page construction items are a type of dynamic web page element.

If any of the page construction items or page content items correspond to a dynamic web page element, at step 610, for each dynamic web page element, the content platform generates content associated with the dynamic web page element. For example, a page building engine 150 included in content platform 100 generates dynamic content and/or transmits a request to a personalization service 410, search service 420, or other content generation service for generated content. Generating dynamic content associated with a dynamic web page element is performed in a manner similar to that discussed above with respect to page building engine 150, personalization service 410, and search service 420.

In some embodiments, a page construction item indicates one or more content generation parameters for generating the dynamic content, such as a target content type, types of user information to use, rules and/or algorithms to use, rules and/or algorithms to avoid, and/or the like. The content platform applies one or more rules, algorithms, machine learning models, and/or the like to generate dynamic content based on the one or more content generation parameters. In some embodiments, generating content for a dynamic section includes determining a number of entities to include in the section, an entity type of each entity, and generating the content for each entity included in the section. In some embodiments, generating dynamic content includes selecting an existing section, entity, and/or content item from the data store and retrieving page construction items and/or page content items corresponding to the selected elements.

In some embodiments, a page construction item representing a dynamic web page element indicates a type of the dynamic web page element. The content platform selects one or more rules, algorithms, machine learning models, and/or the like to use based on the type of dynamic web page element. The content platform uses the one or more selected rules, algorithms, machine learning models, and/or the like to generate the dynamic content associated with the dynamic web page element.

Additionally, in some embodiments, generating dynamic content is further based on one or more of the other sections included in the web page, the entities included in the other sections of the web page, other content data included in the web page, and/or metadata associated with the web page (e.g., tags, categories, and/or the like). Generating the dynamic data includes, for example, determining the types of sections included in the web page, determining the types of entities included in each section of the web page, determining the types of content data included in the web page, analyzing the content data included in the web page, retrieving metadata associated with the web page from the data store, and/or the like.

If no page construction items or page content items correspond to a dynamic element, then the method 600 proceeds directly to step 612.

At step 612, the content platform generates an initial web page based on the one or more page content items and the one or more page construction items. If dynamic content was generated at step 610, then generating the initial web page is further based on the generated content. Generating the initial web page is performed in a manner similar to that discussed above with respect to page building engine 150 and constructed page 430.

In some embodiments, the content platform generates a different portion of the initial content interface based on each page construction item and each page content item. If a page construction item represents a dynamic web page element, then the dynamic content generated for the dynamic web page element at step 610 is included in the portion of the content interface corresponding to the dynamic web page element.

If a page construction item indicates that a given web page element includes one or more other web page elements, then the portion of the content interface corresponding to each other web page element is included in the portion of the content interface corresponding to the given web page element. If a web page element corresponds to web page content data, then the web page content data is included in the portion of the content interface corresponding to the given web page element.

If a page construction item indicates that a given web page element includes content data, then the content platform determines one or more page content items that represent the content data. The content platform includes the content data associated with each page content item in the portion of the content interface corresponding to the given web page element.

In some embodiments, generating a portion of the initial content interface includes determining layout, display, render, and/or other visual properties of the portion of the initial content interface and applying the visual properties to the portion of the initial content interface.

At step 614, the content platform determines whether the initial content interface contains any references. In some embodiments, content platform parses the initial content interface to determine whether any of the content data includes tags, placeholder text, or other indicators that the content includes a data reference.

If the initial content interface contains any references, then at step 616, for each reference, the content platform resolves the reference by retrieving data associated with the reference and replacing the reference with the retrieved data. For example, a page building engine 150 and/or an API service 160 included in content platform retrieves the data and replaces the data reference in an initial content interface 430 with the retrieved data. Resolving a reference is performed in a manner similar to that discussed above with respect to page building engine 150 and API service 160.

If the initial content interface does not contain any references, then the method proceeds to directly to step 618.

At step 618, the content platform causes the content interface to be transmitted to the requesting device. For example, API service 160 included in content platform 100 transmits a content interface 430 to the client computing device that requested the content interface.

Example Network Infrastructure

Figure 7:
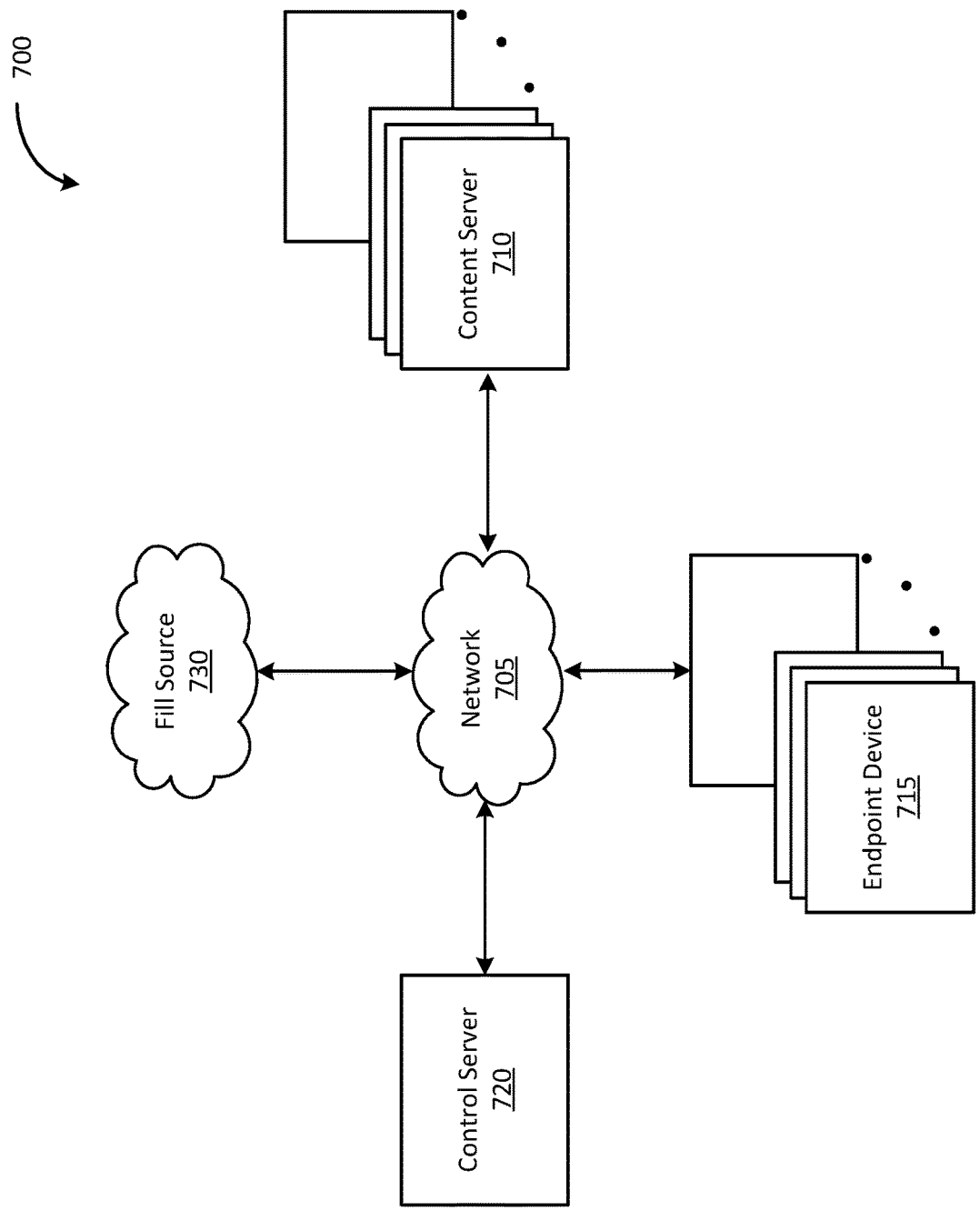
FIG. 7 illustrates a network infrastructure configured to implement one or more aspects of the various embodiments.

FIG. 7 illustrates a network infrastructure configured to implement one or more aspects of the various embodiments.

As shown, network infrastructure 700 includes one or more content servers 710, a control server 720, and one or more endpoint devices 715, which are connected to one another and/or one or more cloud services 730 via a communications network 705. Network infrastructure 700 is generally used to distribute content to content servers 710 and endpoint devices 715.

Each endpoint device 715 communicates with one or more content servers 710 (also referred to as "caches" or "nodes") via network 705 to download content, such as textual data, graphical data, audio data, video data, and other types of data. The downloadable content, also referred to herein as a "file," is then presented to a user of one or more endpoint devices 715. In various embodiments, endpoint devices 715 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Network 705 includes any technically feasible wired, optical, wireless, or hybrid network that transmits data between or among content servers 710, control server 720, endpoint device 715, cloud services 730, and/or other components. For example, network 705 could include a wide area network (WAN), local area network (LAN), personal area network (PAN), WiFi network, cellular network, Ethernet network, Bluetooth network, universal serial bus (USB) network, satellite network, and/or the Internet.

Each content server 710 may include one or more applications configured to communicate with control server 720 to determine the location and availability of various files that are tracked and managed by control server 720. Each content server 710 may further communicate with cloud services 730 and one or more other content servers 710 to "fill" each content server 710 with copies of various files. In addition, content servers 710 may respond to requests for files received from endpoint devices 715. The files may then be distributed from content server 710 or via a broader content distribution network. In some embodiments, content servers 710 may require users to authenticate (e.g., using a username and password) before accessing files stored on content servers 710. Although only a single control server 720 is shown in FIG. 7, in various embodiments multiple control servers 720 may be implemented to track and manage files.

In various embodiments, cloud services 730 may include an online storage service (e.g., Amazon® Simple Storage Service, Google® Cloud Storage, etc.) in which a catalog of files, including thousands or millions of files, is stored and accessed in order to fill content servers 710. Cloud services 730 also may provide compute or other processing services. Although only a single instance of cloud services 730 is shown in FIG. 7, in various embodiments multiple cloud services 730 and/or cloud service instances may be implemented.

In various embodiments, content platform 100 communicates with the one or more content servers 710, a control server 720, and one or more endpoint devices 715 via the network 705. For example, content platform 100 could receive requests for web pages from an endpoint device 715. As another example, content platform 100 could use the one or more content servers 710 as an external data source for data references, such as content metadata, video data, and image data.

Figure 8:
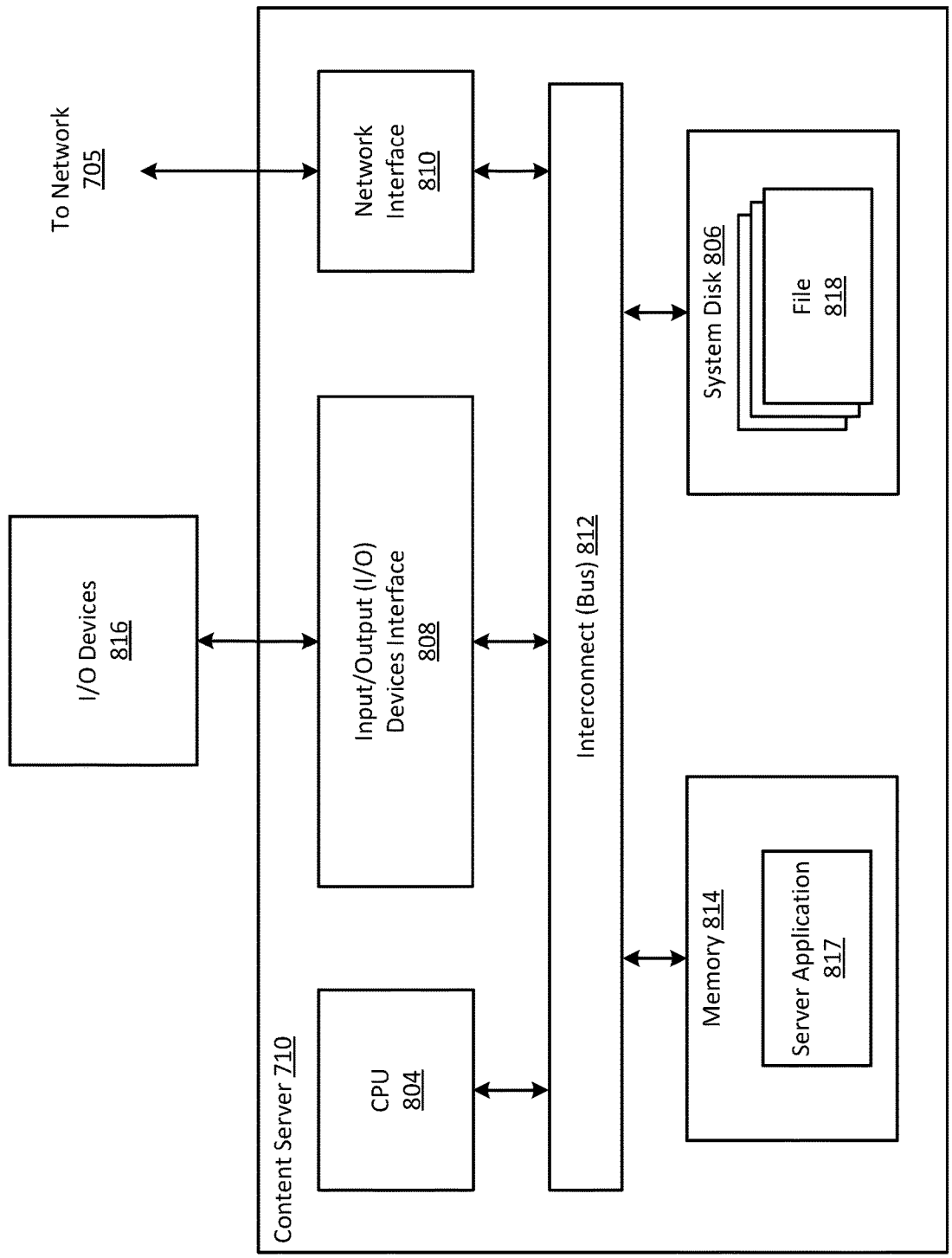
FIG. 8 is a more detailed illustration of the content server of FIG. 7, according to various embodiments.

FIG. 8 is a block diagram of content server 710 that may be implemented in conjunction with the network infrastructure of FIG. 7, according to various embodiments. As shown, content server 710 includes, without limitation, a central processing unit (CPU) 804, a system disk 806, an input/output (I/O) devices interface 808, a network interface 810, an interconnect 812, and a system memory 814.

CPU 804 is configured to retrieve and execute programming instructions, such as a server application 817, stored in system memory 814. Similarly, CPU 804 is configured to store application data (e.g., software libraries) and retrieve application data from system memory 814. Interconnect 812 is configured to facilitate transmission of data, such as programming instructions and application data, between CPU 804, system disk 806, I/O devices interface 808, network interface 810, and system memory 814. I/O devices interface 808 is configured to receive input data from I/O devices 816 and transmit the input data to CPU 804 via interconnect 812. For example, I/O devices 816 may include one or more buttons, a keyboard, a mouse, and/or other input devices. I/O devices interface 208 is further configured to receive output data from CPU 804 via interconnect 812 and transmit the output data to I/O devices 816.

System disk 806 may include one or more hard disk drives, solid state storage devices, or similar storage devices. System disk 806 is configured to store non-volatile data such as files 818 (e.g., audio files, video files, subtitle files, application files, software libraries, etc.). Files 818 can then be retrieved by one or more endpoint devices 715 via network 705. In some embodiments, network interface 810 is configured to operate in compliance with the Ethernet standard.

System memory 814 includes server application 817, which is configured to service requests received from endpoint device 715 and other content servers 710 for one or more files 818. When server application 817 receives a request for a given file 818, server application 817 retrieves the requested file 818 from system disk 806 and transmits file 818 to an endpoint device 715 or a content server 710 via network 705. Files 818 include digital content items such as video files, audio files, and/or still images. In addition, files 818 may include metadata associated with such content items, user/subscriber data, etc. Files 818 that include visual content item metadata and/or user/subscriber data may be employed to facilitate the overall functionality of network infrastructure 700. In alternative embodiments, some or all of files 818 may instead be stored in a control server 720, or in any other technically feasible location within network infrastructure 700.

Figure 9:
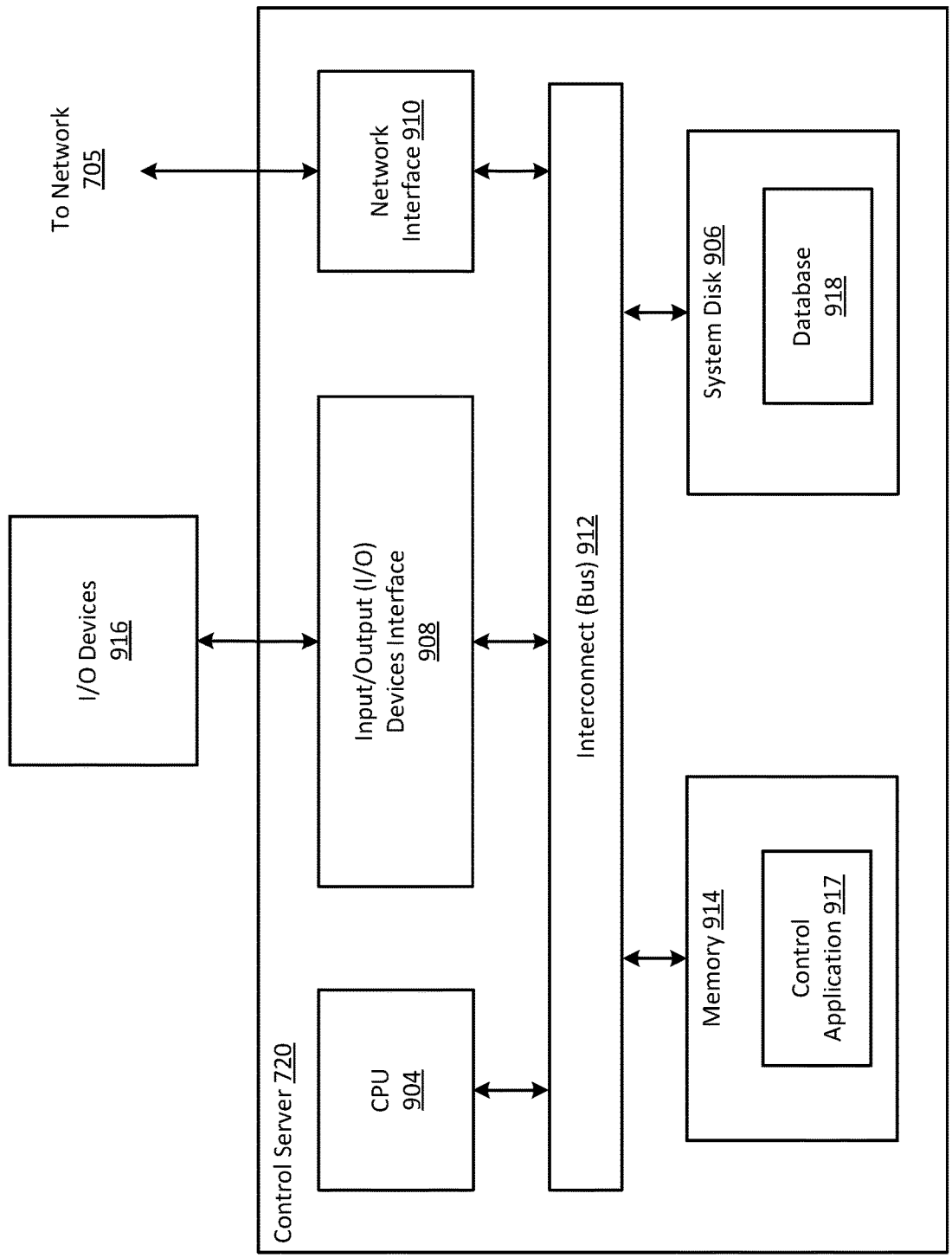
FIG. 9 is a more detailed illustration of the control server of FIG. 7, according to various embodiments.

FIG. 9 is a block diagram of control server 720 that may be implemented in conjunction with the network infrastructure 700 of FIG. 7, according to various embodiments. As shown, control server 720 includes, without limitation, a central processing unit (CPU) 904, a system disk 906, an input/output (I/O) devices interface 908, a network interface 910, an interconnect 912, and a system memory 914.

CPU 904 is configured to retrieve and execute programming instructions, such as control application 917, stored in system memory 914. Similarly, CPU 904 is configured to store application data (e.g., software libraries) and retrieve application data from system memory 914 and a database 918 stored in system disk 906. Interconnect 912 is configured to facilitate transmission of data between CPU 904, system disk 906, I/O devices interface 908, network interface 910, and system memory 914. I/O devices interface 908 is configured to transmit input data and output data between I/O devices 916 and CPU 904 via interconnect 912. System disk 906 may include one or more hard disk drives, solid state storage devices, and the like. System disk 906 is configured to store a database 918 of information associated with content servers 710, cloud services 730, and files 818.

System memory 914 includes a control application 917 configured to access information stored in database 918 and process the information to determine the manner in which specific files 818 will be replicated across content servers 710 included in the network infrastructure 700. Control application 917 may further be configured to receive and analyze performance characteristics associated with one or more of content servers 710 and/or endpoint devices 715. As noted above, in some embodiments, metadata associated with such visual content items, and/or user/subscriber data may be stored in database 918 rather than in files 818 stored in content servers 710.

Figure 10:
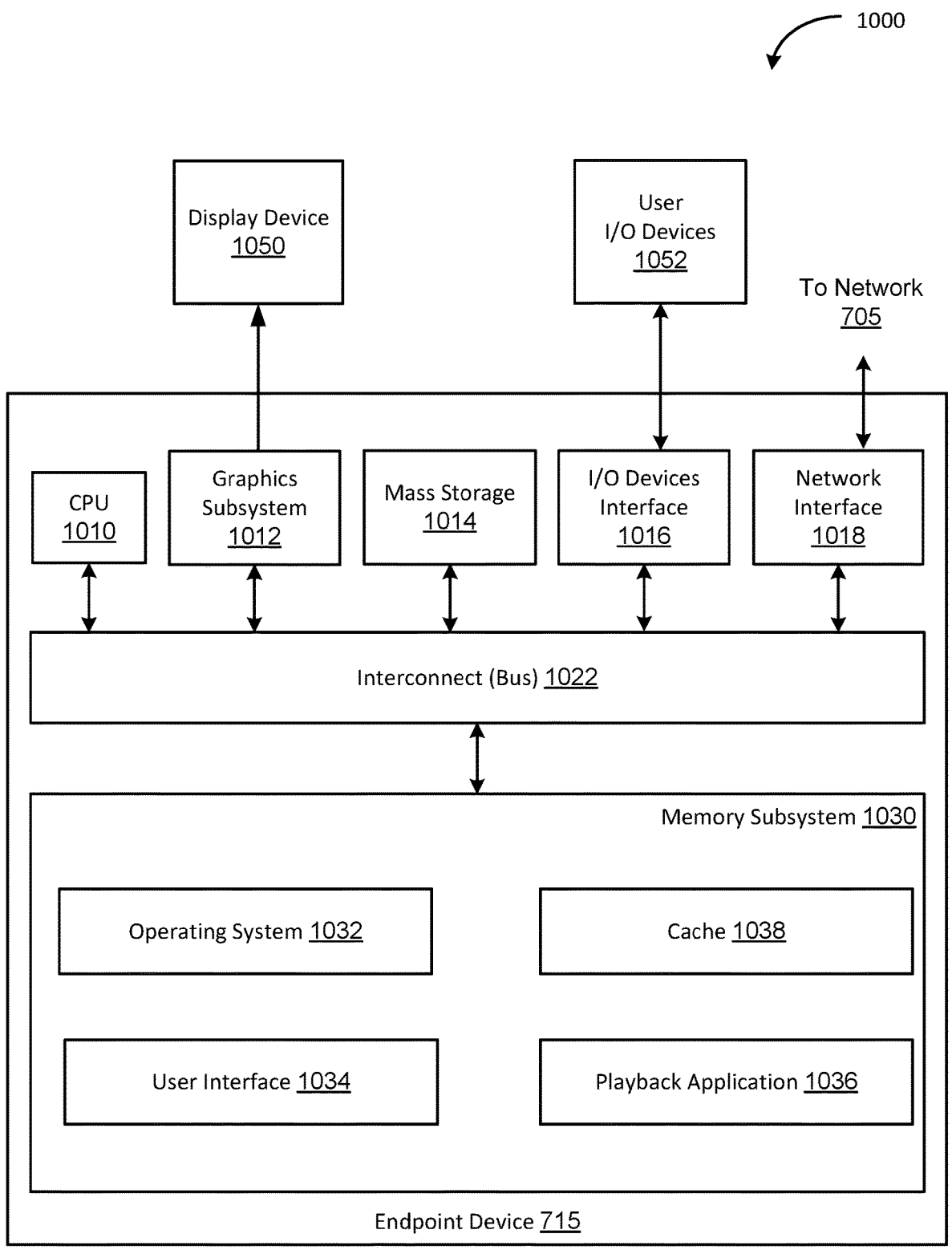
FIG. 10 is a more detailed illustration of the endpoint device of FIG. 7, according to various embodiments.

FIG. 10 is a block diagram of endpoint device 715 that may be implemented in conjunction with the network infrastructure of FIG. 7, according to various embodiments. As shown, endpoint device 715 may include, without limitation, a CPU 1010, a graphics subsystem 1012, an I/O devices interface 1014, a mass storage unit 1016, a network interface 1018, an interconnect 1022, and a memory subsystem 1030.

In some embodiments, CPU 1010 is configured to retrieve and execute programming instructions stored in memory subsystem 1030. Similarly, CPU 1010 is configured to store and retrieve application data (e.g., software libraries) residing in memory subsystem 1030. Interconnect 1022 is configured to facilitate transmission of data, such as programming instructions and application data, between CPU 1010, graphics subsystem 1012, I/O devices interface 1014, mass storage unit 1016, network interface 1018, and memory subsystem 1030.

In some embodiments, graphics subsystem 1012 is configured to generate frames of video data and transmit the frames of video data to display device 1050. In some embodiments, graphics subsystem 1012 may be integrated into an integrated circuit, along with CPU 1010. Display device 1050 may comprise any technically feasible means for generating an image for display. For example, display device 1050 may be fabricated using liquid crystal display (LCD) technology, cathode-ray technology, and light-emitting diode (LED) display technology. I/O devices interface 1014 is configured to receive input data from user I/O devices 1052 and transmit the input data to CPU 1010 via interconnect 1022. For example, user I/O devices 1052 may include one or more buttons, a keyboard, and/or a mouse or other pointing device. I/O devices interface 1014 also includes an audio output unit configured to generate an electrical audio output signal. User I/O devices 1052 includes a speaker configured to generate an acoustic output in response to the electrical audio output signal. In alternative embodiments, display device 1050 may include the speaker. Examples of suitable devices known in the art that can display video frames and generate an acoustic output include televisions, smartphones, smartwatches, electronic tablets, and the like.

A mass storage unit 1016, such as a hard disk drive or flash memory storage drive, is configured to store non-volatile data. Network interface 1018 is configured to transmit and receive packets of data via network 705. In some embodiments, network interface 1018 is configured to communicate using the well-known Ethernet standard. Network interface 1018 is coupled to CPU 1010 via interconnect 1022.

In some embodiments, memory subsystem 1030 includes programming instructions and application data that include an operating system 1032, a user interface 1034, a playback application 1036, and a platform player 1038. Operating system 1032 performs system management functions such as managing hardware devices including network interface 1018, mass storage unit 1016, I/O devices interface 1014, and graphics subsystem 1012. Operating system 1032 also provides process and memory management models for user interface 1034, playback application 1036, and/or platform player 1038. User interface 1034, such as a window and object metaphor, provides a mechanism for user interaction with endpoint device 715. Persons skilled in the art will recognize the various operating systems and user interfaces that are well-known in the art and suitable for incorporation into endpoint device 715.

In some embodiments, playback application 436 is configured to request and receive content from content server 710 via network interface 1018. Further, playback application 1036 is configured to interpret the content and present the content via display device 1050 and/or user I/O devices 1052. In so doing, playback application 1036 may generate frames of video data based on the received content and then transmit those frames of video data to platform player 1038. In response, platform player 1038 causes display device 1050 to output the frames of video data for playback of the content on endpoint device 715. In one embodiment, platform player 1038 is included in operating system 1032.

In sum, a content platform includes a content management system (CMS) and an ingestion service. When a content creator publishes a web page via the CMS, the CMS data for the web page is transmitted to the ingestion service. The ingestion service divides the web page into different atomic elements. The atomic elements include structural elements that define the structure of the web page, and content elements that define the content included in the page. The atomic elements can also include dynamic elements that are generated and populated when the web page is provided to a client device. The ingestion service translates each atomic element into a data format and structure (e.g., instructions written in a domain-specific language) that can be processed by downstream components of the content platform in order to generate dynamic content, personalized content, and/or the like based on the different atomic elements.

The content platform further includes one or more page generation components, such as a page building engine, a personalization service, a search service, and/or the like. When a client device transmits a request associated with a given web page to the content platform, the content platform retrieves the different atomic elements that are associated with the requested web page. If an atomic element is a dynamic element, the content platform generates the content, structure, layout, and/or the like corresponding to the dynamic element. Generating the content and/or layout for a dynamic element includes, for example, applying personalization algorithms, using machine learning models to generate and/or select content, retrieving product data associated with the other content elements, identifying popular content, identifying new content, and/or the like. The content platform constructs a content interface associated with the requested web page based on the structural elements, content elements, and any content generated based on dynamic elements.

At least one technical advantage of the disclosed techniques relative to the prior art is that, with the disclosed techniques, a content platform delivers web-based content to a given user that includes both content that is explicitly provided by a content creator via a content management system and personalized content that is generated for the given user. In particular, by converting content received from the content management system into different atomic elements, the content platform can personalize specific atomic elements without affecting the overall look and feel of the content specified by the content creator. Furthermore, the personalized atomic elements are identified based on portions of the content where the content creator specified that personalization should occur. As a result, using the disclosed techniques, a content creator can predict and control the amount, location, and appearance of personalized content within a given web page, which the content creator could not do using a typical content management system. These technical advantages provide one or more technical advancements over prior art approaches.

1. In some embodiments, a method for generating personalized web content comprises receiving, from a user device, a request for a web page; in response to receiving the request for the web page, retrieving one or more page construction items associated with the web page and one or more page content items associated with the web page, wherein each page construction item included in the one or more page construction items indicates a structure of a different element included in the web page and each page content item included in the one or more page content items indicates a content of a different element included in the web page; and generating a content interface associated with the web page based on the one or more page construction items, the one or more page content items, and user data associated with a user of the user device.

2. The method of clause 1, wherein generating the content interface comprises: determining that a first page construction item corresponds to a web page element that includes dynamically-generated content; and generating a portion of the content interface corresponding to the web page element based at least on the user data.

3. The method of clause 1 or clause 2, wherein the first page construction item specifies one or more content generation parameters, and wherein generating the portion of the content interface is further based on the one or more content generation parameters.

4. The method of any of clauses 1-3, wherein the first page construction item specifies a content type of the dynamically-generated content, and wherein generating the portion of the content interface comprises selecting a personalization algorithm based on the content type of the dynamically-generated content and executing the selected personalization algorithm.

5. The method of any of clauses 1-4, wherein generating the content interface comprises: determining that a second page construction item corresponds to a web page section that includes dynamically-generated content; selecting one or more web page elements from a plurality of web page elements; and generating a portion of the content interface corresponding to the web page section based on the one or more web page elements.

6. The method of any of clauses 1-5, wherein generating the content interface comprises: determining that a first page content item corresponds to dynamic content; generating the dynamic content based at least on the user data; and including the dynamic content in the content interface.

7. The method of any of clauses 1-6, wherein the first page content item specifies one or more content generation parameters, and wherein generating the dynamic content is further based on the one or more content generation parameters.

8. The method of any of clauses 1-7, wherein the first page content item specifies a type of dynamic content, and wherein generating the dynamic content comprises selecting a personalization algorithm based on the type of dynamic content and executing the selected personalization algorithm.

9. The method of any of clauses 1-8, wherein generating the content interface comprises: generating a first portion of the content interface based on a first page construction item, wherein the first page construction item corresponds to a first web page element; generating a second portion of the content interface based on a second page construction item, wherein the second page construction item corresponds to a second web page element; determining that the second web page element is included in the first web page element; and merging the second portion of the content interface with the first portion of the content interface.

10. The method of any of clauses 1-9, wherein generating the content interface comprises: generating a first portion of the content interface based on a first page construction item, wherein the first page construction item corresponds to a structure of a first web page element; generating first content data based on a first page content item, wherein the first content item corresponds to a content of the web page element; merging the first content data with the first portion of the content interface based on the first page construction item.

11. In some embodiments, one or more non-transitory computer-readable media include instructions that, when executed by one or more processors, cause the one or more processors to perform the steps of: receiving, from a user device, a request for a web page; in response to receiving the request for the web page, retrieving one or more page construction items associated with the web page and one or more page content items associated with the web page, wherein each page construction item included in the one or more page construction items indicates a structure of a different element included in the web page and each page content item included in the one or more page content items indicates a content of a different element included in the web page; and generating a content interface associated with the web page based on the one or more page construction items, the one or more page content items, and user data associated with a user of the user device.

12. The one or more non-transitory computer-readable media of clause 11, wherein generating the content interface comprises: determining that a first page construction item corresponds to a web page element that includes dynamically-generated content; and generating a portion of the content interface corresponding to the web page element based at least on the user data.

13. The one or more non-transitory computer-readable media of clause 11 or clause 12, wherein generating the portion of the content interface is further based on content indicated by at least one page content item included in the one or more page content items.

14. The one or more non-transitory computer-readable media of any of clauses 11-13, wherein the first page construction item specifies a content type of the dynamically-generated content, and wherein generating the portion of the web page comprises selecting one or more page content items from a plurality of page content items associated with one or more second web pages.

15. The one or more non-transitory computer-readable media of any of clauses 11-14, wherein retrieving the one or more page construction items comprises: determining that a first page construction item includes a reference to a second page construction item that is associated with a second web page; and retrieving the second page construction item.

16. The one or more non-transitory computer-readable media of any of clauses 11-15, wherein retrieving the one or more page content items comprises: determining that a first page construction item includes a reference to a first page content item that is associated with a second web page; and retrieving the first page content item.

17. The one or more non-transitory computer-readable media of any of clauses 11-16, wherein generating the content interface comprises: determining that a first page content item includes a reference to content data associated with a data source; retrieving the content data from the data source based on the reference.

18. The one or more non-transitory computer-readable media of any of clauses 11-17, wherein generating the content interface comprises: generating a first portion of the content interface based on a first page construction item, wherein the first page construction item corresponds to a first web page element; generating a second portion of the content interface based on a second page construction item, wherein the second page construction item corresponds to a second web page element; determining that the second web page element is included in the first web page element; and merging the second portion of the content interface with the first portion of the content interface.

19. The one or more non-transitory computer-readable media of any of clauses 11-18, wherein generating the content interface comprises: generating a first portion of the content interface based on a first page construction item, wherein the first page construction item corresponds to a structure of a first web page element; generating first content data based on a first page content item, wherein the first content item corresponds to a content of the web page element; merging the first content data with the first portion of the content interface based on the first page construction item.

20. In some embodiments, a system comprises one or more memories storing instructions; and one or more processors that are coupled to the one or more memories and, when executing the instructions, perform the steps of: receiving, from a user device, a request for a web page; in response to receiving the request for the web page, retrieving one or more page construction items associated with the web page and one or more page content items associated with the web page, wherein each page construction item included in the one or more page construction items indicates a structure of a different element included in the web page and each page content item included in the one or more page content items indicates a content of a different element included in the web page; and generating a content interface associated with the web page based on the one or more page construction items, the one or more page content items, and user data associated with a user of the user device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for generating personalized web content, the method comprising:
   receiving one or more web pages;
   dividing the one or more web pages into a plurality of atomic elements;
   generating one or more page construction items and one or more page content items from the plurality of atomic elements;
   receiving, from a user device, a request to construct a web page;
   in response to receiving the request for the web page, retrieving one or more page construction items associated with the requested web page and one or more page content items associated with the requested web page, wherein each page construction item included in the one or more page construction items indicates a structure of a different element included in the requested web page and each page content item included in the one or more page content items indicates a content of a different element included in the requested web page; and
   generating a content interface associated with the requested web page based on the one or more page construction items, the one or more page content items, and user data associated with a user of the user device.

2. The method of claim 1, wherein generating the content interface comprises:
   determining that a first page construction item corresponds to a web page element that includes dynamically-generated content; and
   generating a portion of the content interface corresponding to the web page element based at least on the user data.

3. The method of claim 2, wherein the first page construction item specifies one or more content generation parameters, and wherein generating the portion of the content interface is further based on the one or more content generation parameters.

4. The method of claim 2, wherein the first page construction item specifies a content type of the dynamically-generated content, and wherein generating the portion of the content interface comprises selecting a personalization algorithm based on the content type of the dynamically-generated content and executing the selected personalization algorithm.

5. The method of claim 1, wherein generating the content interface comprises:
   determining that a second page construction item corresponds to a web page section that includes dynamically-generated content;
   selecting one or more web page elements from a plurality of web page elements; and
   generating a portion of the content interface corresponding to the web page section based on the one or more web page elements.

6. The method of claim 1, wherein generating the content interface comprises:
- determining that a first page content item corresponds to dynamic content;
- generating the dynamic content based at least on the user data; and
- including the dynamic content in the content interface.

7. The method of claim 6, wherein the first page content item specifies one or more content generation parameters, and wherein generating the dynamic content is further based on the one or more content generation parameters.

8. The method of claim 6, wherein the first page content item specifies a type of dynamic content, and wherein generating the dynamic content comprises selecting a personalization algorithm based on the type of dynamic content and executing the selected personalization algorithm.

9. The method of claim 1, wherein generating the content interface comprises:
- generating a first portion of the content interface based on a first page construction item, wherein the first page construction item corresponds to a first web page element;
- generating a second portion of the content interface based on a second page construction item, wherein the second page construction item corresponds to a second web page element;
- determining that the second web page element is included in the first web page element; and
- merging the second portion of the content interface with the first portion of the content interface.

10. The method of claim 1, wherein generating the content interface comprises:
- generating a first portion of the content interface based on a first page construction item, wherein the first page construction item corresponds to a structure of a first web page element;
- generating first content data based on a first page content item, wherein the first content item corresponds to a content of the web page element;
- merging the first content data with the first portion of the content interface based on the first page construction item.

11. One or more non-transitory computer-readable media including instructions that, when executed by one or more processors, cause the one or more processors to perform the steps of:
- receiving one or more web pages;
- dividing the one or more web pages into a plurality of atomic elements;
- generating one or more page construction items and one or more page content items from the plurality of atomic elements;
- receiving, from a user device, a request to construct a web page;
- in response to receiving the request for the web page, retrieving one or more page construction items associated with the requested web page and one or more page content items associated with the requested web page, wherein each page construction item included in the one or more page construction items indicates a structure of a different element included in the requested web page and each page content item included in the one or more page content items indicates a content of a different element included in the requested web page; and
- generating a content interface associated with the requested web page based on the one or more page construction items, the one or more page content items, and user data associated with a user of the user device.

12. The one or more non-transitory computer-readable media of claim 11, wherein generating the content interface comprises:
- determining that a first page construction item corresponds to a web page element that includes dynamically-generated content; and
- generating a portion of the content interface corresponding to the web page element based at least on the user data.

13. The one or more non-transitory computer-readable media of claim 12, wherein generating the portion of the content interface is further based on content indicated by at least one page content item included in the one or more page content items.

14. The one or more non-transitory computer-readable media of claim 12, wherein the first page construction item specifies a content type of the dynamically-generated content, and wherein generating the portion of the web page comprises selecting one or more page content items from a plurality of page content items associated with one or more second web pages.

15. The one or more non-transitory computer-readable media of claim 11, wherein retrieving the one or more page construction items comprises:
- determining that a first page construction item includes a reference to a second page construction item that is associated with a second web page; and
- retrieving the second page construction item.

16. The one or more non-transitory computer-readable media of claim 11, wherein retrieving the one or more page content items comprises:
- determining that a first page construction item includes a reference to a first page content item that is associated with a second web page; and
- retrieving the first page content item.

17. The one or more non-transitory computer-readable media of claim 11, wherein generating the content interface comprises:
- determining that a first page content item includes a reference to content data associated with a data source;
- retrieving the content data from the data source based on the reference.

18. The one or more non-transitory computer-readable media of claim 11, wherein generating the content interface comprises:
- generating a first portion of the content interface based on a first page construction item, wherein the first page construction item corresponds to a first web page element;
- generating a second portion of the content interface based on a second page construction item, wherein the second page construction item corresponds to a second web page element;
- determining that the second web page element is included in the first web page element; and
- merging the second portion of the content interface with the first portion of the content interface.

19. The one or more non-transitory computer-readable media of claim 11, wherein generating the content interface comprises:
- generating a first portion of the content interface based on a first page construction item, wherein the first page construction item corresponds to a structure of a first web page element;

generating first content data based on a first page content item, wherein the first content item corresponds to a content of the web page element;

merging the first content data with the first portion of the content interface based on the first page construction item.

20. A system comprising:

one or more memories storing instructions; and one or more processors that are coupled to the one or more memories and, when executing the instructions, perform the steps of:

receiving one or more web pages;

dividing the one or more web pages into a plurality of atomic elements;

generating one or more page construction items and one or more page content items from the plurality of atomic elements;

receiving, from a user device, a request to construct a web page;

in response to receiving the request for the web page, retrieving one or more page construction items associated with the requested web page and one or more page content items associated with the requested web page, wherein each page construction item included in the one or more page construction items indicates a structure of a different element included in the requested web page and each page content item included in the one or more page content items indicates a content of a different element included in the requested web page; and generating a content interface associated with the requested web page based on the one or more page construction items, the one or more page content items, and user data associated with a user of the user device.

* * * * *